United States Patent
Kim et al.

(10) Patent No.: US 12,516,821 B2
(45) Date of Patent: Jan. 6, 2026

(54) COOKING APPLIANCE AND METHOD FOR CONTROLLING THE SAME

(71) Applicant: LG ELECTRONICS INC., Seoul (KR)

(72) Inventors: Dong Han Kim, Seoul (KR); Dongkwan Yu, Seoul (KR); Ugjin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 704 days.

(21) Appl. No.: 17/874,043

(22) Filed: Jul. 26, 2022

(65) Prior Publication Data

US 2023/0213206 A1   Jul. 6, 2023

(30) Foreign Application Priority Data

Jan. 5, 2022 (KR) .................. 10-2022-0001811

(51) Int. Cl.
*F24C 7/08* (2006.01)
*G06Q 50/06* (2024.01)

(52) U.S. Cl.
CPC ............. *F24C 7/087* (2013.01); *G06Q 50/06* (2013.01)

(58) Field of Classification Search
CPC ....... F24C 7/087; G06Q 50/06; H05B 6/6447; H05B 6/6473; H05B 6/6482; H05B 6/6488
See application file for complete search history.

(56) References Cited

U.S. PATENT DOCUMENTS

| | | | |
|---|---|---|---|
| 4,332,992 A | 6/1982 | Larsen et al. | |
| 2011/0071696 A1* | 3/2011 | Burt | G06Q 50/06 700/295 |
| 2015/0292749 A1* | 10/2015 | Kim | F24C 7/085 99/335 |
| 2019/0045973 A1* | 2/2019 | Gill | A47J 27/086 |
| 2021/0235555 A1* | 7/2021 | Lim | H05B 6/6411 |

FOREIGN PATENT DOCUMENTS

| | | | |
|---|---|---|---|
| GB | 2106374 A | 4/1983 | |
| GB | 2237487 A | 5/1991 | |
| GB | 2445524 A | 7/2008 | |
| JP | 2911425 B2 | 6/1999 | |
| JP | 2003157964 A | 5/2003 | |

* cited by examiner

*Primary Examiner* — Robert G Bachner
(74) *Attorney, Agent, or Firm* — Bryan Cave Leighton Paisner LLP

(57) ABSTRACT

A cooking appliance having a casing with a cavity formed therein, a first heat source module configured to emit microwaves being arranged at a side surface of the casing, a second heat source module configure to emit magnetic fields being arranged at a bottom surface of the casing, and a third heat source module configured to generate radiant heat is arranged at an upper portion of the casing, whereby the first, second, and third heat source modules operate simultaneously or alternately.

16 Claims, 21 Drawing Sheets

FIG. 14

| Induction Power Level | Power | Remark |
| --- | --- | --- |
| 10 | 1600W | Inverter Linear Power Control |
| 9 | 1440W | |
| 8 | 1280W | |
| 7 | 1120W | |
| 6 | 960W | |
| 5 | 800W | |
| 4 | 640W | |
| 3 | 440W | |
| 2 | PL4 : 6s ON / 6s OFF | Linear Power Control + ON/OFF Power control |
| 1 | PL3 : 6s ON / 6s OFF | |

COOKING APPLIANCE AND METHOD FOR CONTROLLING THE SAME

CROSS REFERENCE TO RELATED APPLICATION

The present application claims priority to Korean Patent Application No. 10-2022-0001811, filed on Jan. 5, 2022, the entire contents of which is incorporated by reference herein for all purposes as if fully set forth herein.

BACKGROUND OF THE INVENTION

1. Field of the Invention

The present disclosure relates to a cooking appliance and a method for controlling the same.

2. Description of the Related Art

Various types of cooking appliances are used to heat food at home or in restaurants, including, for example, microwave ovens, induction heating electric ranges, and grill heaters.

A microwave oven is a high-frequency heating type of cooking appliance. The microwave oven heats food by using molecules in a high-frequency electric field vibrating strongly to generate heat. The microwave oven can heat food evenly in a relatively short time.

An induction heating electric range is a cooking appliance that uses electromagnetic induction to heat an object to be heated. Specifically, when high-frequency power of a predetermined size is applied to a coil, the induction heating electric range generates eddy currents in the object to be heated, which is made of a metal substance, using a magnetic field generated around the coil, and thus heating the object to be heated.

A grill heater is a cooking appliance that heats food by radiating or convention of infrared heat. The grill heater allows infrared heat to pass through the food, so that the food can be cooked evenly throughout.

Accordingly, as the cooking appliances using various types of heat sources are released, the number and types of cooking appliances provided to users have increased, and there is a problem in that the cooking appliances occupy a large volume in the living space. There exists a demand for a composite cooking appliance having a plurality of heating modules together. In addition, it is necessary to develop a cooking appliance that uses a plurality of heat sources at the same time so that food in the object to be heated is cooked more uniformly and quickly.

For example, U.S. Pat. No. 6,987,252 B2 discloses a cooking appliance with a heat source using microwaves, radiant heat, and convection heat. For example, Korean Patent No. 10-2018-0115981 discloses a cooking appliance with a heat source using microwaves, a heat source using radiant heat, and a heat source generating convection heat. For example, Korean patent No. 10-2021-0107487 discloses a cooking appliance configured to use microwaves and an induction heat source with a single apparatus at the same time.

However, the foregoing references do not disclose a technique of changing locations of some of a plurality of heat sources so as to efficiently use the plurality of heat sources. The cooking appliance with the plurality of heat sources may be configured to control operation of non-use heat sources since location changing of the some heat sources influences usage of other heat sources. Furthermore, when the plurality of heat sources is used at the same time, there is a problem in that electricity consumption may exceed allowable electricity and a circuit breaker may trip.

SUMMARY OF THE INVENTION

An objective of the present disclosure is to operate a plurality of heat sources included in a cooking appliance at the same time or to operate some of the plurality of heat sources.

Another objective of the present disclosure is to alternately operate a plurality of heat sources included in a cooking appliance.

A further objective of the present disclosure is, when a plurality of heat sources included in a cooking appliance are alternately operated, to operate a heat source provided at a bottom surface of the cooking appliance first.

A further objective of the present disclosure is to determine simultaneous operation and alternated operation of a plurality of heat sources included in a cooking appliance by comparing total electricity consumption, which is used when the plurality of heat sources are operated at the same time, to allowable electricity.

According to the present disclosure for achieving at least the above described objectives, a cooking appliance may include a casing having a cavity therein. A first heat source module emitting microwaves may be arranged at a side surface of the casing. A second heat source module emitting magnetic fields may be arranged at a bottom surface of the casing, and a third heat source module generating radiant heat may be arranged at an upper portion of the casing. A processor may control operations of the first, second, and third heat source modules.

When operation commands of the first, second, and third heat source modules are input, the processor may operate the first, second, and third heat source modules at the same time in response to a comparison result between a total electricity consumption used when the first, second, third heat source modules are operated at the same time and a preset allowable electricity. When the total electricity consumption is less than the allowable electricity, the processor may operate the first, second, and third heat source modules at the same time. However, when the total electricity consumption is larger than the allowable electricity, the processor may alternately operate the first, second, and third heat source modules.

When the processor alternately operates the first, second, and third heat source modules, the processor may operate the second heat source module first. In a case where the processor operates the second heat source module, when a container is detected at an upper surface of the second heat source module, the processor may operate the second heat source module. Then, when the processor alternately operates the first, second, and third heat source modules, it may be preferable that the processor alternately operates the first, second, and third heat source modules in order of the second heat source module, the third heat source module, and the first heat source module. Because of this order, when all the first, second, and third heat source modules are operated at the same time, a circuit breaker trips and cuts off power due to overvoltage or overcurrent.

The cooking appliance according to the embodiment of may include an input part. The input part may be input with cooking levels of the first, second, and third heat source modules. When a user touches and selects cooking levels, electricity consumption used during cooking and operation time may be determined. Herein, the second heat source module may be operated for a first preset time with a first electricity consumption corresponding to an input cooking level for the second heat source module, the third heat source module may be operated for a time of an input cooking level of the third heat source module × a second preset time by a second electricity consumption corresponding to a maximum cooking level of the second heat source module, and the first heat source module may be operated for a time of an input cooking level of the first heat source module × a third preset time by the second electricity consumption and to stop operation of the first heat source module for a fourth preset time.

When the processor alternately operates the first, second, and third heat source modules, the processor may repeat the alternate operation of the first, second, and third heat source modules until the input cooking time ends.

The first heat source module may be configured to emit microwaves toward the cavity, and the second heat source module may be configured to emit magnetic fields toward the cavity, and the third heat source module may be configured to emit radiant heat toward the cavity.

The cooking appliance according to the present disclosure has at least the following effects.

According to the present disclosure, the cooking appliance with the plurality of heat sources can increase the quality of cooking by using the plurality of heat sources at the same time and reduce the cooking time.

According to the present disclosure, some of the plurality of heat sources can be selectively operated according to a kind and properties of food.

According to the present disclosure, when all the plurality of heat sources are operated for cooking, the plurality of heat sources can be alternately operated.

According to the present disclosure, when the plurality of heat sources are alternately operated, a heat source located at the bottom surface of the cooking appliance is operated first, so that it is possible to detect whether a container is located or not when the heat source is used.

According to the present disclosure, in the cooking appliance with the plurality of heat sources, total electricity consumption used when the plurality of heat sources are operated at the same time are compared to allowable electricity to determine simultaneous operation and alternated operation of the heat sources, so that cooking is safely performed without operating a circuit breaker.

The objects of the present disclosure are not limited to the above-described objects, and other objects and advantages not mentioned may be understood by the following description, and will be more clearly understood by the embodiments of the present disclosure. In addition, it will be easily seen that the objects and advantages of the present disclosure may be realized by the means described in the claims and combinations thereof.

BRIEF DESCRIPTION OF THE DRAWINGS

The accompanying drawings constitute a part of this specification and illustrate one or more embodiments of the present disclosure and together with the specification, explain the present disclosure.

FIG. 14 is an example view showing electricity consumption in response to cooking levels of the second heat source module in the cooking appliance according to the embodiment of the present disclosure.

DETAILED DESCRIPTION OF THE INVENTION

Figure 1:
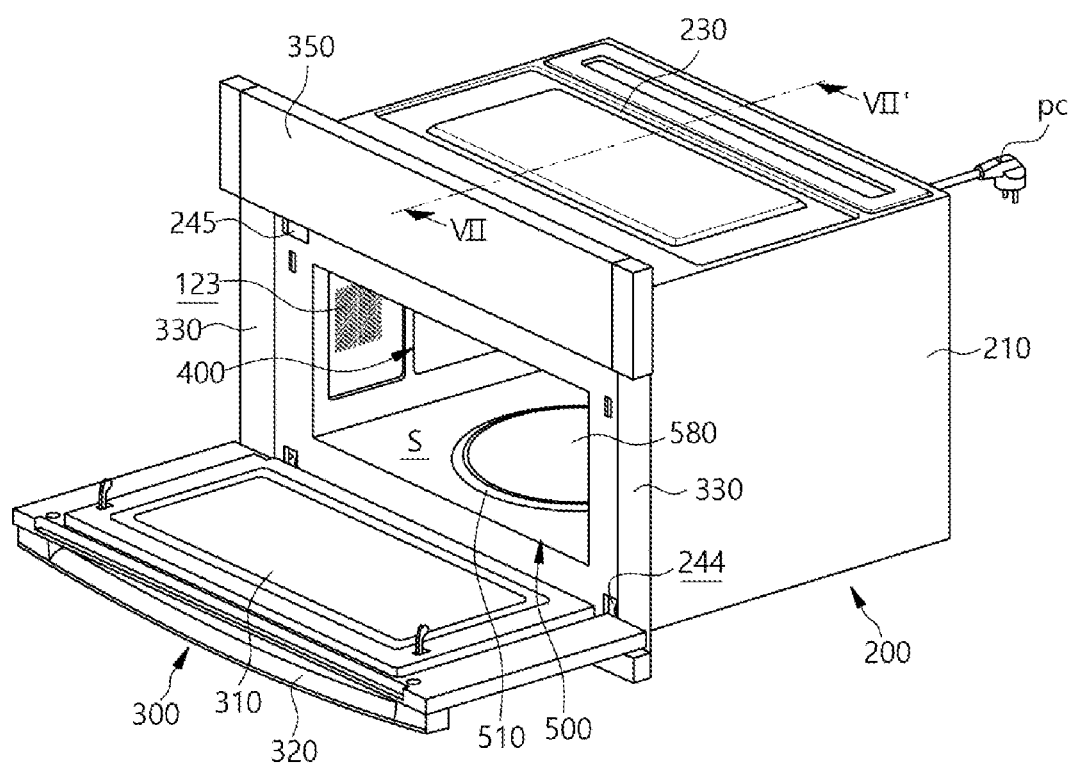
FIG. 1 is a perspective view showing a cooking appliance according to an embodiment of the present disclosure.

The above-described objects, features, and advantages will be described below in detail with reference to the accompanying drawings, and accordingly, those skilled in the art to which the present disclosure pertains will be able to easily practice the technical spirit of the present disclosure. In describing the present disclosure, when it is determined that a detailed description of a known technique related to the present invention may unnecessarily obscure the gist of the present disclosure, the detailed description will be omitted. Hereinafter, embodiments according to the present disclosure will be described in detail with reference to the accompanying drawings. In the drawings, the same reference numerals are used to indicate the same or similar components.

Although the first, second, etc. are used to describe various components, it is understood that these components are not limited by these terms. These terms are only used to distinguish one component from other components, and unless otherwise stated, it is understood that the first component may also be the second component.

As used herein, unless specifically stated otherwise, each component may be singular or plural.

As used herein, the singular expression includes the plural expression unless the context clearly dictates otherwise. In the present disclosure, terms such as "consisting of" or "comprising" should not be construed as necessarily including all of the various components or various steps described in the specification, and should be construed that some components or some steps may not be included, or additional components or steps may be further included.

As used herein, various singular forms "a," "an" and "the" are intended to include various plural forms as well, unless context clearly indicates otherwise. For example, a term "a" or "an" shall mean "one or more," even though a phrase "one or more" is also used herein. Use of the optional plural "(s)," "(es)," or "(ies)" means that one or more of the indicated feature is present.

As used herein, "up-down direction" means the up-down direction of the cooking appliance in a state in which the cooking appliance (or other components) is installed for daily use. "Left-right direction" means a direction perpendicular to the up-down direction, and the front-rear direction means a direction perpendicular to both the up-down direction and the left-right direction. "Bilateral direction" or "lateral direction" has the same meaning as the left-right direction, and these terms may be used interchangeably in the present specification.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present. A cooking appliance of the present disclosure is provided to cook object to be cooked (hereinbelow, which will be referred to as "food") using a plurality of heat sources. The cooking appliance of the present disclosure may include a first heat source module 400, a second heat source module 500, and a third heat source module 600. The first heat source module 400, the second heat source module 500, and the third heat source module 600 may be respectively arranged in the cooking appliance of the present disclosure, and may consist of different types of heat sources. Hereinbelow, the plurality of heat sources, cooling fan modules for cooling the heat sources, and devices for measuring a state of the cooking appliance will be described.

FIG. 1 is a view showing a cooking appliance according to an embodiment of the present disclosure. As shown, a cavity S may be provided inside the cooking appliance, and the cavity S may be opened and closed by a door 300. Except for the door 300, the rest of parts of the cooking appliance may be shielded by a casing 100, 200. The cavity S is an empty or hollowed out space, and may be a cooking chamber. The casing 100, 200 may include an inner casing 100 and an outer casing 200. Specific structures of the inner casing 100 and the outer casing 200 will be described below.

In the embodiment shown in FIG. 1, the first heat source module 400 may be arranged at a left portion of the cooking appliance and the second heat source module 500 may be arranged at the bottom of the cooking appliance. Then, the third heat source module 600 may be arranged at an upper portion of the cooking appliance. As described above, in the embodiment, the first heat source module 400, the second heat source module 500, and the third heat source module 600 may be respectively arranged at different surfaces among six surfaces constituting the casing 100, 200, and the arrangement of such is not limited to the particular arrangement shown in FIG. 1.

Figure 2:
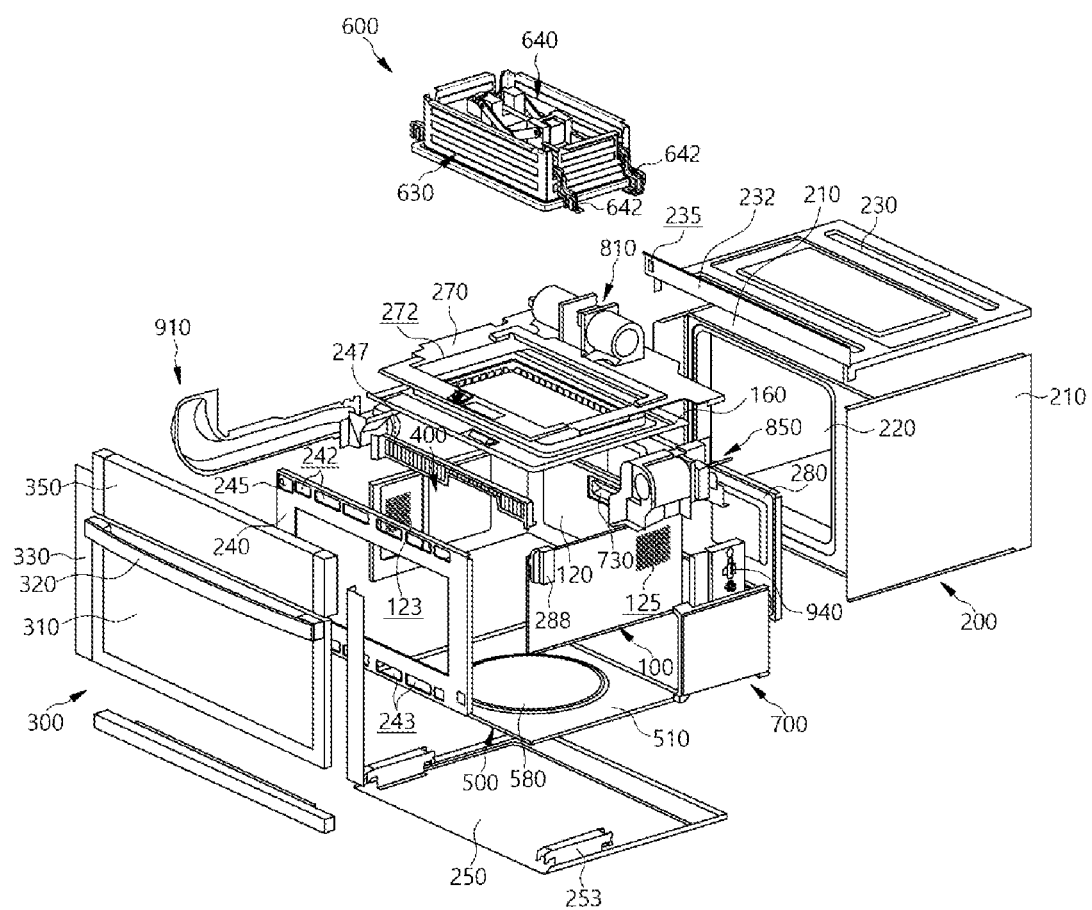
FIG. 2 is an exploded-perspective view showing components constituting the cooking appliance according to the embodiment of the present disclosure.

FIG. 2 is a view showing disassembled components constituting the cooking appliance, wherein the third heat source module 600 is exposed. In the embodiment, the third heat source module 600 may vertically move between a first location and a second location. For example, as shown, the third heat source module 600 may vertically move toward the bottom surface of the cavity S, i.e., toward the second heat source module 500 while being raised and lowered.

Alternatively, for example, the first heat source module 400 may be arranged at a right side portion of the cooking appliance, and the third heat source module 600 may be arranged at a rear surface of the cooking appliance. Furthermore, the third heat source module 600 may be fixed to the casing 100, 200 without moving.

As shown in FIG. 2, the inner casing 100 constituting the casing 100, 200 may be provided to surround the cavity S. The inner casing 100 may include a pair of inner side plates 110 and an inner rear plate 120 connecting the pair of inner side plates 110 to each other. The pair of inner side plates 110 and the inner rear plate 120 may be formed approximately in a "⊂"-like shape.

The third heat source module 600 may be arranged at an upper portion of the inner casing 100. In other words, the third heat source module 600 may shield an upper portion of the cavity S. The second heat source module 500 may be arranged at a lower portion of the inner casing 100. The second heat source module 500 may shield a lower portion of the cavity S. Therefore, the second heat source module 500 and the third heat source module 600 may also be a part of the inner casing 100 surrounding the cavity S.

The pair of inner side plates 110 may respectively include an inlet port 123 and an outlet port 125. The inlet port 123 and the outlet port 125 may be respectively formed on the pair of side plates, and may be arranged at the opposite sides to each other. The inlet port 123 and the outlet port 125 are open toward the cavity S to connect the cavity S to the outside space.

The inlet port 123 may be open toward the cavity S. A supply duct 910 may be arranged on an outer surface of one of the pair of side plate with the inlet port 123 so that air may be supplied through the inlet port 123. Water evaporates from the food cooked by the first heat source module 400 so that moisture may be generated inside the cavity S. In order to remove such moisture, it is necessary to supply air into the cavity S. In the embodiment, air may be injected through the inlet port 123 and may be discharged through the outlet port 125 located opposite to the inlet port 123. Herein, the air supplied through the inlet port 123 may be a part of air acting heat dissipation (cooling) while passing through the inside space of the casing 100, 200.

Figure 3:
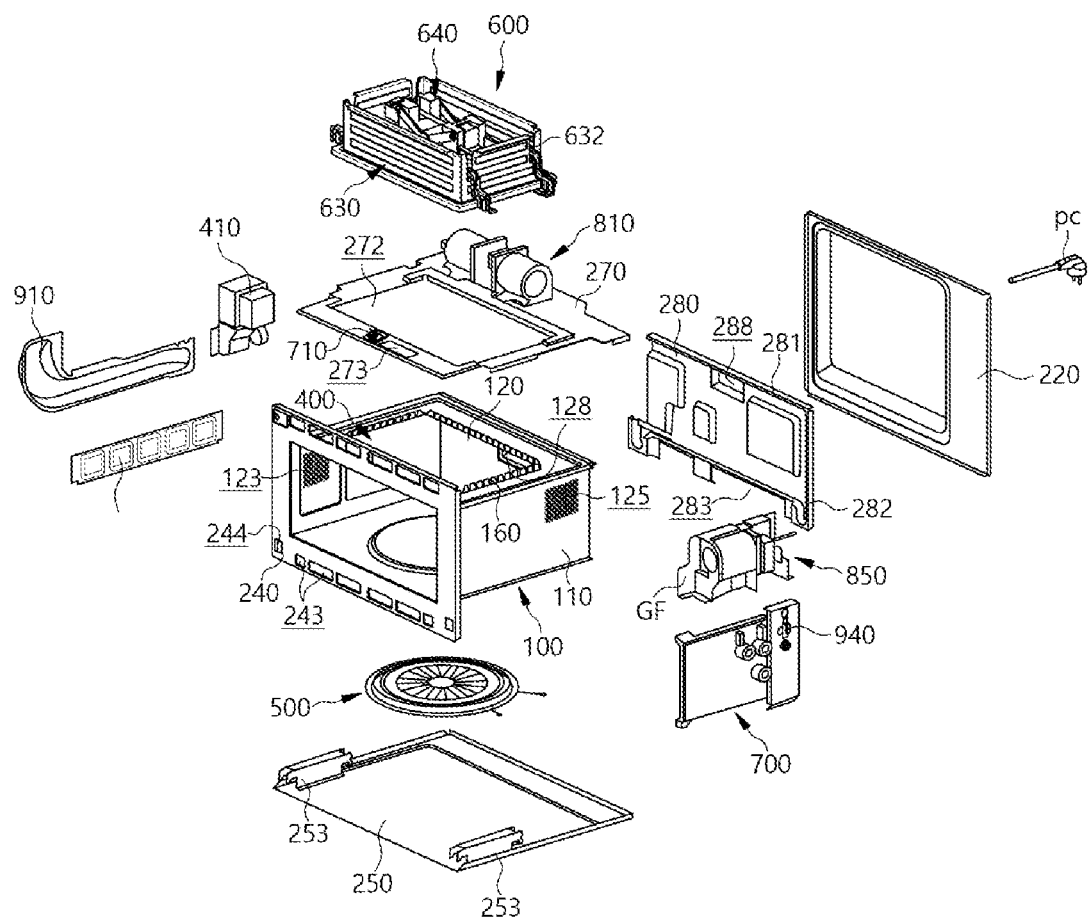
FIG. 3 is an exploded-perspective view showing components, from which excluding a door, an outer side plate, and an outer upper plate are excluded, constituting the cooking appliance according to the embodiment of the present disclosure.

As shown in FIG. 3, the inner rear plate 120 may include a camera mounting part 128. A camera module 730 may be mounted to the camera mounting part 128. The camera mounting part 128 may have a shape of recessing rearward from the cavity S, but, at a view taken from the rear side of the inner rear plate 120, the camera mounting part 128 may have a protruding structure. Preferably, the camera mounting part 128 may be arranged at a center portion of the inner rear plate 120, so that the camera module 730 may face the center of the cavity S. The camera module 730 may widely capture the inside of the cavity S. For this purpose, the camera module 730 may face a center portion of the cavity S.

Figure 5:
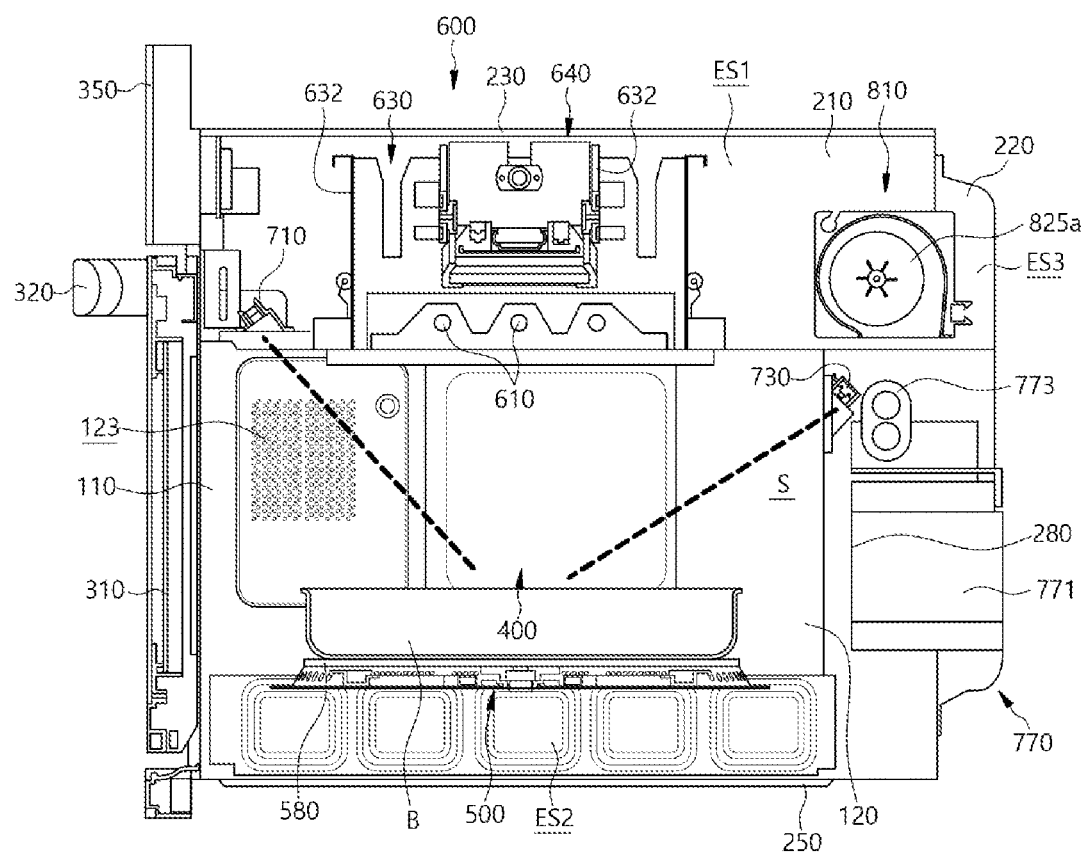
FIG. 5 is a sectional view taken along line VII-VII' in FIG. 1.

As shown in FIG. 5, the camera module 730 may be provided to observe the inside space of the cavity S. The camera module 730 may allow the user to observe the food in the cavity S in real time, and the processor 700 may analyze images captured by the camera module 730 to control proper cooking temperature and time.

Figure 4:
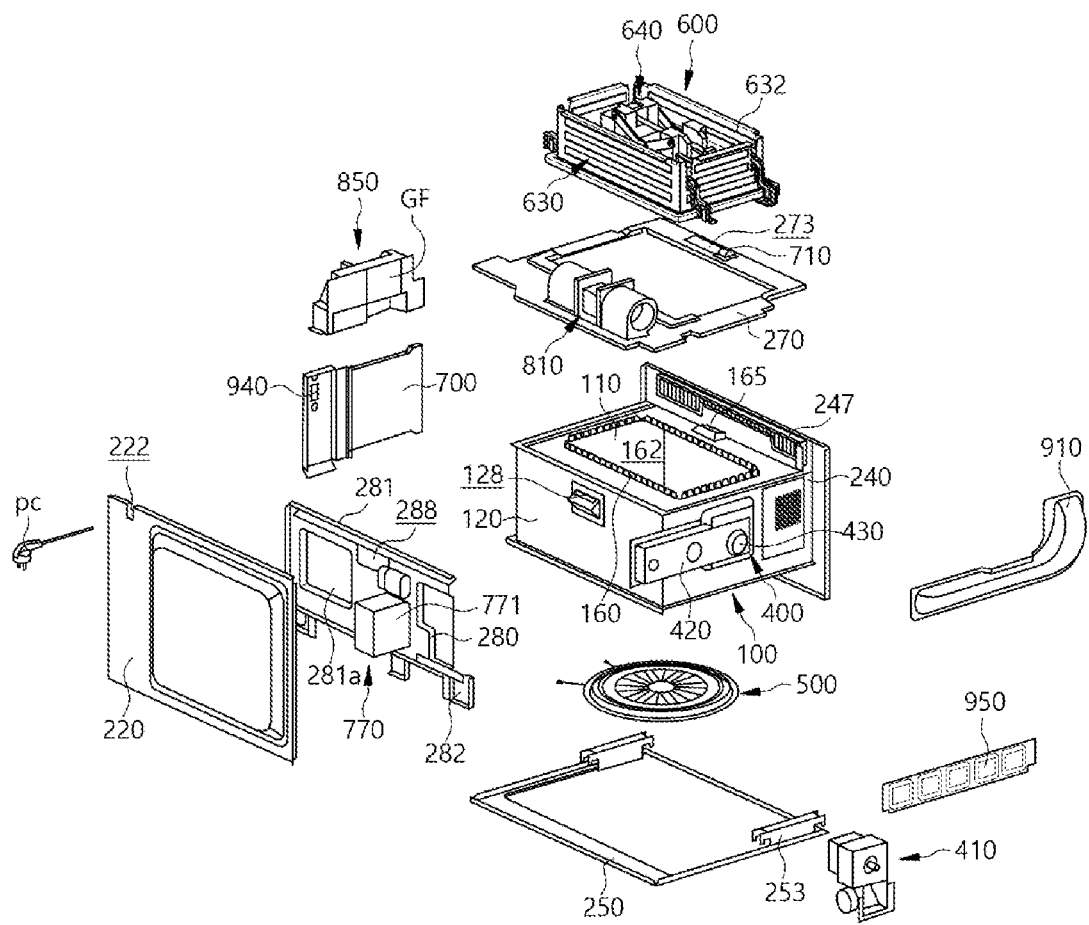
FIG. 4 is an exploded-perspective view showing the structure shown in FIG. 3, the view being taken at the opposite angle to an angle of FIG. 3.

Referring to FIGS. 3 and 4, an inner upper plate 160 may be arranged at an upper portion of the inner rear plate 120. The inner upper plate 160 may have approximately a rectangular frame shape, and may be arranged along an upper edge of the pair of side plates. An upper plate opening 162, i.e., a kind of empty or hollow space, may be provided in a center portion of the inner upper plate 160. The third heat source module 600 may be raised and lowered through the upper plate opening 162.

The inner upper plate 160 may include a lighting part 165. The lighting part 165 may be provided at an upper portion of the inner upper plate 160. In the embodiment, the lighting part 165 may be provided at a middle portion of a front portion of the inner upper plate 160, which is close to the door 300.

The lighting part 165 may have an inclined shape. Accordingly, the lighting part 165 may have a light emitting angle that is inclined toward the center portion of the cavity S.

The outer casing 200 may be arranged outside of the inner casing 100. The outer casing 200 may enclose the inner casing 100. An electric chamber, which is a predetermined space, may be provided between the inner casing 100 and the outer casing 200. The processor 700, a first cooling fan module 810, a second cooling fan module 850, and a power unit 770, etc. may be located in the electric chamber. The third heat source module 600 may be arranged between the inner casing 100 and the outer casing 200.

As shown in FIG. 2, the outer casing 200 may include a pair of outer side plates 210, an outer rear plate 220 connecting the pair of outer side plates 210 to each other, an outer upper plate 230 arranged at an upper portion of the outer casing 200, an outer front plate 240 arranged at a front portion of the outer casing 200, and the outer lower plate 250. The outer casing 200 may cover the entire outer surfaces of the inner casing 100, and therefore, the inner casing 100 may be covered from the outside space by the outer casing 200.

The outer upper plate 230 may be formed approximately in a rectangular plate. The outer upper plate 230 may be arranged above the third heat source module 600. The outer upper plate 230 may shield the third heat source module 600. The outer upper plate 230 may be a part arranged at the outmost side of the upper portion of the cooking appliance.

An upper plate shielding part 232 may be provided at a front portion of the outer upper plate 230. The upper plate shielding part 232 may be formed such that the front portion of the outer upper plate 230 is perpendicularly bent. The upper plate shielding part 232 may support a display substrate (not shown) indicated in a display module 350 to be described below, at the rear side of the display substrate. The upper plate shielding part 232 may prevent the inner structure of the cooking appliance from being exposed forward through the display module 350. The reference numeral 235 may be a hole through which a portion of a wire harness may pass rearward, and may be omitted.

The outer front plate 240 may be arranged at the rear side of the door 300. The outer front plate 240 may have approximately a rectangular frame shape. A center portion of the outer front plate 240 may be empty to expose the inside space of the cavity S to the outside space. The outer front plate 240 may be coupled to front portions of the pair of inner side plates 110 constituting the inner casing 100. Therefore, the outer front plate 240 may be a part of the inner casing 100, not a part of the outer casing 200.

In the embodiment, the height of the outer front plate 240 is higher than the pair of inner side plates 110 constituting the inner casing 100, so that empty spaces may be formed at an upper rear portion and a lower rear portion of the outer front plate 240, respectively. These empty spaces may serve as electric chambers in which parts are mounted and may serve as a heat dissipation space to dissipate heat of the parts. For example, the first cooling fan module 810, the second cooling fan module 850, and the third heat source module 600, which will be describe below, may be arranged at a rear side of a portion of the outer front plate 240, the portion protruding further upward than the pair of inner side plates 110.

The outer front plate 240 may have an inlet part 242 and an air outlet part 243. In the embodiment, the air inlet part 242 may be arranged in an upper portion of the outer front plate 240 and the air outlet part 243 may be arranged in a lower portion of the outer front plate 240. The air inlet part 242 and the air outlet part 243 may extend in a transverse width direction of the outer front plate 240. Outside air may be introduced into a first electric chamber ES1 through the air inlet part 242 to cool the parts including the heat sources, and air heated by heat of the parts may be discharged to the outside space through the air outlet part 243.

Furthermore, the air inlet part 242 may be formed in the portion of the outer front plate 240, the portion protruding further upward than the pair of inner side plates 110. The first cooling fan module 810 and the second cooling fan module 850 may be arranged at the rear side of the air inlet part 242. Therefore, when the first cooling fan module 810 and the second cooling fan module 850 are operated, outside air may be introduced, through the air inlet part 242, into the first electric chamber ES1 provided between the outer upper plate 230 and the inner upper plate 160.

The air outlet part 243 may be formed in a portion of the outer front plate 240, the portion protruding further downward than the second heat source module 500. A second electric chamber ES2 formed between the second heat source module 500 and the outer lower plate 250 may be provided at the rear side of the air outlet part 243. Air introduced into the cooking appliance through the air inlet part 242 may be discharged through the air outlet part 243 after passing through the second electric chamber ES2.

A hinge hole 244 may be provided in a lower portion of the outer front plate 240. The hinge hole 244 may be a portion through which a hinge assembly (not shown) of the door 300 may pass. The hinge assembly may pass through the hinge hole 244, and then be coupled to a hinge holder 253 provided at the outer lower plate 250.

A connector 245 may be provided at the upper portion of the outer front plate 240. The connector 245 may be arranged at the upper portion of the outer front plate 240. The connector 245 may be electrically connected to the processor 700, and an operator may control the processor 700 by contacting the connector 245. The connector 245 may be omitted or be arranged at the outer rear plate 220 or the pair of outer side plates 210.

A shield frame 247 may be provided at the rear side of the outer front plate 240. The shield frame 247 may be arranged behind the air inlet part 242 of the outer front plate 240, and may block access to the wire harness from the outside space, and shield the parts in the cooking appliance. The shield frame 247 may have a plurality of slits, so that the air introduced through the air inlet part 242 may pass through the plurality of slits.

The outer casing 200 may include the outer lower plate 250. The outer lower plate 250 may be arranged below the inner casing 100. In the embodiment, the outer lower plate 250 may connect the outer rear plate 220 to the outer front plate 240. Furthermore, the outer lower plate 250 may be connected to an insulation rear plate 280 to be described below. The outer lower plate 250 may be spaced apart from the second heat source module 500, and the gap between the outer lower plate 250 and the second heat source module 500 may serve as the second electric chamber ES2.

Meanwhile, regarding the electric chamber as described above, the electric chamber may be divided into a plurality of spaces. According to the embodiment, the electric chamber may be divided into the first electric chamber ES1 to a fifth electric chamber ES5; (i) the first electric chamber ES1 may be formed between the inner upper plate 160 and the outer upper plate 230, (ii) the second electric chamber ES2 may be formed between the second heat source module 500 and the outer lower plate 250, (iii) a third electric chamber ES3 may be formed between the insulation rear plate 280 and the outer rear plate 22, which will be described later, (iv) a fourth electric chamber ES4 and a fifth electric chamber ES5 may be respectively provided between the pair of inner side plates 110 and the pair of outer side plates 210. This arrangement of first electric chamber ES1 to the fifth electric chamber ES5 may be arbitrarily separated and may be connected to each other.

Herein, each of the electric chambers may be formed on each of surfaces of the casing. The first electric chamber to the fifth electric chamber ES1 to ES5 may be formed on different surfaces of the hexahedral casing. The first heat source module 400, the second heat source module 500, and the third heat source module 600 may be disposed on different surfaces of the casing.

The outer casing 200 may include an insulation upper plate 270. The insulation upper plate 270 may be arranged between the outer upper plate 230 and the inner upper plate 160. Since high temperature heat is generated during the cooking process in the cavity S, the temperature of the inner upper plate 160 may increase. The insulation upper plate 270 may reduce heat transferred from the inner upper plate 160 to the outer upper plate 230. The insulation upper plate 270 may have a rectangular frame shape with the empty center portion same as the inner upper plate 160. A movable opening 272 provided in a center portion of the insulation upper plate 270 may be connected to the upper plate opening 162 of the inner upper plate 160, and the third heat source module 600 may move through the movable opening 272 and the upper plate opening 162.

As shown in FIGS. 3 and 4, the distance sensor 710 and the cooling fan module 810, 850 may be arranged at an insulation upper plate 270. As the distance sensor 710 and the cooling fan module 810, 850 are arranged at the insulation upper plate 270, heat in the cavity S may be prevented from being directly transferred to the distance sensor 710 and the cooling fan module 810, 850. Therefore, the durability of the cooling fan module 810, 850 may be improved.

The distance sensor 710 may detect, among other things, an existence of the food, a thickness of the food, or a height of the food. The distance sensor 710 may measure the thickness or the height of the food, and the processor 700 may separately control operation and temperature of the first heat source module 400, the second heat source module 500, or the third heat source module 600 on the basis of the measured information. Furthermore, the distance sensor 710 may measure the thickness or the height of the food, which is changed in response to cooking time, and the processor 700 may control a remaining cooking time or temperature. The distance sensor 710 may be an infrared sensor.

Furthermore, according to an embodiment, the distance sensor 710 may be preferably arranged at a center portion based on a transverse width of the insulation upper plate 270 to face the center portion of the cavity S. The inner upper plate 160 may be arranged below the insulation upper plate 270, but the inner upper plate 160 may have a sensing hole, so that the distance sensor 710 may sense the inside space of the cavity S through the sensing hole. As described above, in the embodiment, the distance sensor 710 is arranged at the insulation upper plate 270, so that heat of the cavity S may be prevented from being directly transferred to the distance sensor 710. Therefore, the durability of the distance sensor 710 may be improved.

A protection cover 276 may be provided at the insulation upper plate 270 to block electromagnetic wave introduced through a gap between a moving assembly 630 and a fixed assembly 640 to be described below. The protection cover 276 may have a shape of surrounding an edge of a fan through portion 278a, 278b provided at the center of the insulation upper plate 270. The protection cover 276 will be described in further detail below.

The insulation upper plate 270 may have the fan through portion 278a, 278b. The fan through portion 278a, 278b may be formed at a portion of the insulation upper plate 270, the portion protruding rearward more than the inner casing 100. Therefore, the fan through portion 278a, 278b may be open toward the outside space of the inner casing 100. According to the embodiment, the fan through portion 278a, 278b may be open toward the rear side of the insulation rear plate 280 coupled to the inner casing 100.

The first cooling fan module 810 may be arranged in one portion of the fan through portion 278a, 278b. The power supply unit 770 may be arranged below the fan through portion 278a, 278b. Therefore, air discharged from the first cooling fan module 810 may be discharged to the power supply unit 770 through the fan through portion 278a, 278b.

The power supply unit 770 may be supplied with external power and transfer the power to the internal parts of the cooking appliance. The power supply unit 770 may include a high voltage transformer 771, a high voltage capacitor 773, and a fuse 775. The parts constituting the power supply unit 770 are only examples, and additional parts may be provided or some parts may be omitted.

The high voltage transformer 771 may serve to apply a high voltage current to a magnetron 410. For example, the high voltage transformer 771 may be a part provided to boost the household voltage, which is usually 100-220V, to a high voltage. Furthermore, the high voltage transformer 771 may supply power to the working coil 570 of the second heat source module 500 or a heating unit 610 of the third heat source module 600. In the drawing, a busbar or a wire harness, which connects the high voltage transformer 771, the magnetron 410, etc. to each other, is omitted.

In the embodiment, the power supply unit 770 may be arranged on a surface 281 of the insulation rear plate 280. The insulation rear plate 280 may be coupled to the inner rear plate 120, and may prevent heat of the inner rear plate 120 from being directly transferred to the power supply unit 770. The insulation rear plate 280 may have approximately a rectangular plate shape, and may include a camera avoidance hole 288 preventing interference between the insulation rear plate 280 and the camera module 730.

Both the high voltage transformer 771 and the high voltage capacitor 773 may be mounted to a rear surface 281*a* of the insulation rear plate 280. In the embodiment, the high voltage transformer 771 may be arranged at a right side portion of the insulation rear plate 280 based on the center of the insulation rear plate 280. Specifically, the high voltage transformer 771 may be arranged at a lower portion of the second cooling fan module 850.

As shown in FIG. 2, the insulation rear plate 280 may be arranged between the inner rear plate 120 and the outer rear plate 220. The insulation rear plate 280 may be coupled to the inner rear plate 120, and the third electric chamber ES3 may be provided between the insulation rear plate 280 and the outer rear plate 220. The insulation rear plate 280 may supply heat transferred from the inner rear plate 120 to the outer rear plate 220 like the insulation upper plate 270.

As shown in FIGS. 3 and 4, the insulation rear plate 280 may have a rectangular plate shape. A first surface of the insulation rear plate 280 may face the inner rear plate 120 and a second surface of the insulation rear plate 280 may face the outer rear plate 220. The insulation rear plate 280 may be coupled to the inner rear plate 120, and the power supply unit 770 may be arranged on the surface of the insulation rear plate 280, the surface facing the outer rear plate 220. Therefore, the insulation rear plate 280 may prevent or substantially reduce heat of the inner upper plate 160 from being directly transferred to the power supply unit 770.

A spacer 282 may be arranged at a lower portion of the insulation rear plate 280. The spacer 282 may protrude downward from the insulation rear plate 280. The spacer 282 may be provided to space a lower end of the insulation rear plate 280 from the outer lower plate 250. Air may flow into an empty space between the lower end of the insulation rear plate 280 and the outer lower plate 250, the empty portion being generated by the spacer 282. The reference numeral 283 may represent a ventilation part through which air flows. The spacer 282 may be integrally formed with the insulation rear plate 280 or be a separate object assembled to the insulation rear plate 280.

As shown in FIGS. 1 and 2, the door 300 may be provided at the front side of the outer front plate 240. The door 300 may serve to open and close the cavity S. The door 300 may be swung by coupling the hinge assembly provided at a lower portion of the door 300 to a hinge holder 253 provided at the outer lower plate 250. A penetration part 310 of the door 300 may be made of a transparent or translucent material, so that a user can observe the cavity S from the outside space. The reference numeral 320 may represent a handle of the door 300.

Left and right frames 330 may be coupled to side surfaces of the door 300, and a lower frame 340 may be coupled to a lower end of the door 300. Although not shown in the drawing, an upper frame may be provided at an upper portion of the door 300. The frames may surround the penetration part 310 to form the frame of the door 300.

The display module 350 may be arranged at an upper portion of the door 300. The display module 350 may indicate a cooking state of the cooking appliance, and may include an interface for the user to manipulate the cooking appliance. The air inlet part 242 may be arranged below the display module 350, thereby preventing the display module 350 from interfering with the air inlet part 242.

The display module 350 may include the input part 351 and a display part 352. The input part 351 may provide an interface for the user to input an operation order to operate the cooking appliance. The display part 352 may display various type of information such as an operation state of the cooking appliance, a cooked state of food, etc. to inform the user of the states of the cooking appliance. The input part 351 may include a touch-type input means. The touch-type input means is a device from which an operation order is input by a touch of the user, and may include a touch sensor detecting a touch movement. The touch-type input means may be realized, for example, with the input part 351 and the display part 352 integrally formed or formed in a single module to be realized as the display module 350. When the display part 352 and the touch sensor are formed in a layered structure to form a touch screen, the display module 350 may be realized as the input part 351. The touch sensor may have a form of a touch film, a touch sheet, a touch pad, etc. The user may input operation orders of the first, second, and third heat source modules 400, 500, and 600 by using the input part 351. Furthermore, the user can input raising and lowering orders of the third heat source module 600 by using the input part 351.

The first heat source module 400 may be arranged at the inner casing 100. The first heat source module 400 may generate microwaves to cook the food. In the embodiment, the first heat source module 400 may be arranged at the pair of inner side plates 110 of the inner casing 100. Referring to FIG. 2, the first heat source module 400 may be arranged at an outer portion of a left one of the pair of inner side plates 110.

Since the magnetron 410 of the first heat source module 400 is arranged close to the insulation rear plate 280, the first heat source module 400 may be arranged at both the fourth electric chamber ES4 and the fifth electric chamber ES5. In other words, the first heat source module 400 may be arranged along two surfaces of the casing 100, 200. Alternatively, the magnetron 410 may also be arranged at the inner side plate 110 together with the wave guide 420. The first heat source module 400 may be arranged at an outer portion of a right one of the pair of inner side plates 110, or at an outer portion of the inner rear plate 120.

Referring to FIGS. 3 and 4, the first heat source module 400 may include the magnetron 410 oscillating microwaves and a wave guide 420 guiding the microwaves oscillated from the magnetron 410 to the cavity S. Herein, the magnetron 410 may be mounted to a portion of the wave guide 420, the portion protruding from the inner side plate 110. The microwaves generated by the magnetron 410 may be transferred to the cavity S through the wave guide 420.

The magnetron 410 may be mounted to a portion protruding from the inner side plate 110, so that the magnetron 410 may be arrange in the third electric chamber ES3. As described above, when the magnetron 410 is arranged in the third electric chamber ES3, the magnetron 410 may be cooled by the first cooling fan module 810.

Next, the second heat source module 500 will be described. The second heat source module 500 may be arranged at a bottom surface of the casing 100, 200. The second heat source module 500 may heat food by an induction heating method. The second heat source module 500 may be attached to the bottom surface of the casing 100, 200. As shown in FIGS. 2 and 3, the second heat source module 500 may constitute the bottom of the inner casing 100. In other words, an upper portion of the second heat source module 500 may be exposed to the cavity S.

The second heat source module 500 may be controlled by the processor 700. The processor 700 may control the second heat source module 500 in an inverter method, and may control power of the second heat source module 500 linearly. Therefore, detailed control of the second heat source module 500 may be realized.

As shown in FIG. 5, a container B may be provided on the second heat source module 500 to put food thereon. A bottom portion of the container B may be made of a metal material having magnetism such as a stainless steel sheet. When the container B is heated by a magnetic field generated by a working coil 570, food in the container B may be heated together.

As shown in FIG. 1, a cover plate 580 may be provided at a center portion of the second heat source module 500, and the container B may be placed on the cover plate 580. The cover plate 580 may be arranged at a location facing a heating unit 610 constituting the third heat source module 600. Therefore, a lower portion of the food may be heated by the second heat source module 500, and an upper portion of the food may be heated by the third heat source module 600.

Figure 6:
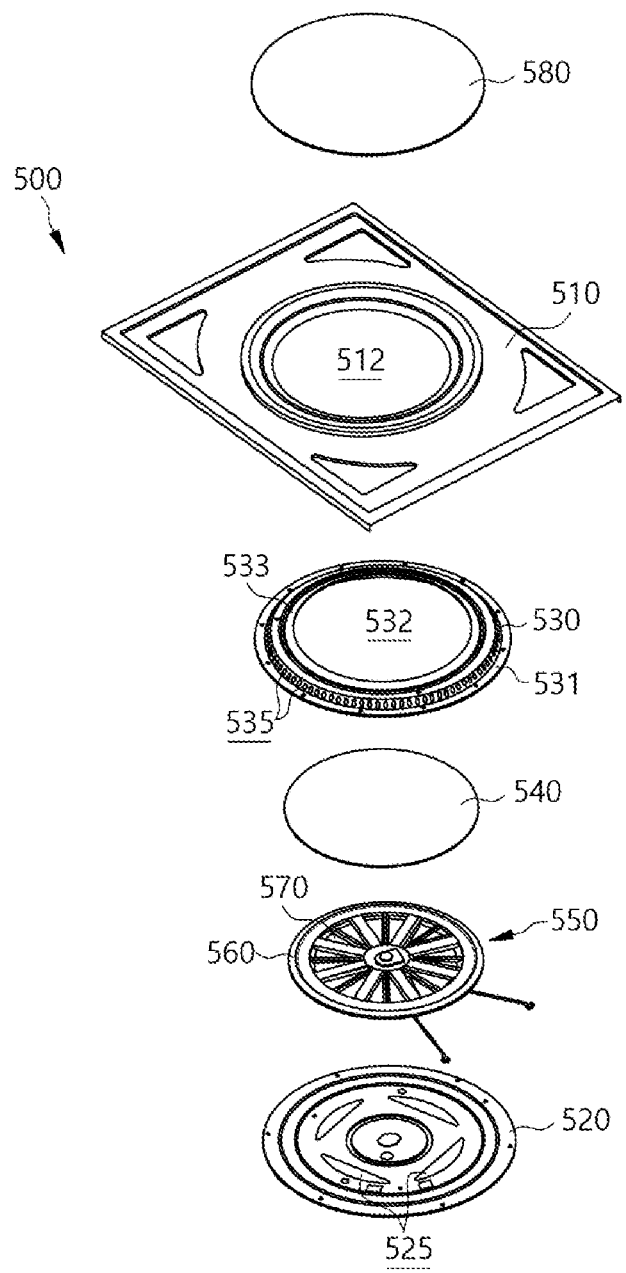
FIG. 6 is an exploded-perspective view showing components of a second heat source module of the cooking appliance according to the embodiment of the present disclosure.

FIG. 6 is a view showing an exploded structure of the second heat source module 500. As shown in the drawings, the second heat source module 500 may include a base plate 510 and a supporter 520. Then, a mounting bracket 530, a shield filter 540, and a coil assembly 550 may be arranged between the base plate 510 and the supporter 520.

The base plate 510 may have approximately a rectangular plate shape having an empty base hole 512 at a center portion thereof, and may be a lower plate of the inner casing 100 constituting the bottom surface of the cavity S. The cover plate 580 may be arranged at the base hole 512, and the cover plate 580 may be composed of a non-magnetic substance. The base plate 510 may be made of a metal material having magnetic properties. The base plate 510 composed of a magnetic substance may prevent the microwaves generated by the first heat source module 400 from reaching the working coil 570.

As shown in FIG. 6, the supporter 520 may have approximately a circular plate shape, and the supporter 520 may have a plurality of heat dissipation slits 525 for heat dissipation. Then, an upper surface of the supporter 520 may include a coil base 560 and the working coil 570 constituting the coil assembly 550. The supporter 520 may serve to shield electromagnetic interference (EMI).

The mounting bracket 530 may be arranged between the base plate 510 and the supporter 520. The mounting bracket 530 may be coupled to both the base plate 510 and the supporter 520 to connect the base plate 510 to the supporter 520. In the embodiment, for example, the base plate 510 and the mounting bracket 530 are welded together, and the mounting bracket 530 and the supporter 520 are screwed together. Alternatively, for example, the base plate 510 and the supporter 520 may be screwed together, and the mounting bracket 530 and the supporter 520 may be welded together.

Herein, the supporter 520 and the coil base 560 may also be screwed together. Accordingly, the coil assembly 550 may be fixed to the base plate 510 with the mounting bracket 530 as a medium as well as to the supporter 520. Therefore, both upper portion and lower portion of the coil assembly 550 may be securely fixed.

The base plate 510 may have a plurality of uneven structures. The uneven structures may be provided to be coupled to the mounting bracket 530, the shield filter 540, and the coil base 560. In the embodiment, the shield filter 540 may be arranged between the uneven structures of the base plate 510 and the coil base 560. The shield filter 540 may be securely fixed between the uneven structures and the coil base 560.

A first cover 513 may be provided at a location adjacent to an edge of the base hole 512. The first cover 513 may cover a part of an edge of the shield filter 540. An edge of the shielding filter 540 may be compressed. Therefore, the microwaves generated by the first heat source module 400 may be prevented from leaking toward the working coil 570 through a gap between the shield filter 540 and the coil base 560.

The base plate 510 and the coil base 560 may be aligned in an X-axis and a Y-axis, and the microwaves generated by the first heat source module 400 may be prevented from leaking through a gap between the base plate 510 and the coil base 560.

Furthermore, the edge of the shielding filter 540 may be compressed. The shielding filter 540 may be fixed in both X-axis and Y-axis directions. Therefore, even when a fastener, such as a screw, is not used, the shield filter 540 may be securely fixed.

The mounting bracket 530 may connect the base plate 510 to the supporter 520. The mounting bracket 530 may have approximately a circular frame shape, and a bracket through portion 532 may be formed in a center portion of the mounting bracket 530. As shown in FIG. 6, the mounting bracket 530 may include a bracket lower portion 531 having a relatively wider diameter, a bracket upper portion 534 having a relatively narrower diameter. The bracket lower portion 531 and the bracket upper portion 534 may be connected to each other by an inclined-shape bracket connection portion 533.

Herein, since the mounting bracket 530 is arranged between the base plate 510 and the supporter 520, the base plate 510 may be spaced apart from the supporter 520 by at least the height of the mounting bracket 530. The coil assembly 550 may be arranged between the spacing between the base plate 510 and the supporter 520. The height of the bracket connection portion 533 may be the height of the mounting bracket 530.

The bracket connection portion 533 may have a bracket heat dissipation hole 535 for heat dissipation. The bracket heat dissipation hole 535 may be open sideways. The bracket heat dissipation hole 535 may dissipate heat between the supporter 520 and the base plate 510, and outside air may be introduced into the bracket heat dissipation hole 535 to cool the coil assembly 550.

The shield filter 540 may be arranged between the cover plate 580 and the coil assembly 550. The shield filter 540 may have an approximately circular plate structure (not limited thereto), and may cover an upper portion of the working coil 570. The shield filter 540 may prevent microwaves generated from the first heat source module 400 from being transferred to the working coil 570. The shield filter 540 may be composed of any one of graphite, graphene, carbon fabric, carbon paper, carbon felt, or similar material, such that, the shield filter 540 may have excellent microwave shielding performance due to high thermal conductivity. Furthermore, since the shield filter 540 may maintain heating by the second heat source module 500, heating performance of the second heat source module 500 may be substantially improved or maximized. Furthermore, when the shield filter 540 is composed of any one of graphite, graphene, carbon fabric, carbon paper, carbon felt, or similar material, it is easier to emit heat increased by microwaves due to high thermal conductivity.

In this embodiment, for example, the shield filter 540 may be formed by laminating a graphite sheet and a mica sheet together. Herein, the mica sheet may be thicker than the graphite sheet. For example, when the thickness of the graphite sheet is 0.2 mm, the thickness of the mica sheet may be 1.0 mm.

The diameter of the shield filter 540 may be larger than the diameter of the working coil 570, and may be smaller than the diameter of the cover plate 580 and the diameter of the supporter 520. Accordingly, the shield filter 540 may completely cover an upper portion of the working coil 570, thereby blocking the microwaves transferred to the working coil 570. Conversely, the shield filter 540 may efficiently transmit the magnetic fields, which is generated by the working coil 570, upward through the cover plate 580.

The shield filter 540 may be fixed to the second heat source module 500 without a separate fastening tool. However, when the fastening tool is used, the microwaves may be introduced toward the working coil 570 through a hole for fastening the fastening tool, a screw thread, or the like, thereby affecting the working coil 570. Furthermore, an electric field is concentrated to an edge of a hole or a sharp screw thread so that arc discharge may occur and a fire may occur. Therefore, a structure is applied to the embodiment to fix the shield filter 540 without a fastening tool.

The coil base 560 of the coil assembly 550 may have a circular shape and the working coil 570 is wound on the coil base 560. A temperature sensor (not shown) may be arranged at a center portion of the coil assembly 550. The temperature sensor may measure the temperature of the second heat source module 500. Based on the temperature of the second heat source module 500 measured by the temperature sensor, the user can adjust the temperature of the second heat source module 500. Although not shown in the drawings, in order to increase the density of magnetic field generated by the working coil 570, the coil assembly 550 may further contain ferrite, which is a magnetic ceramic material having oxidized steel (Fe2O3) as a main component.

The cover plate 580 may be arranged in the base hole 512 of the base plate 510. The cover plate 580 may have approximately a circular plate shape. The cover plate 580 may cover the base hole 512, and may form an upper surface of the second heat source module 500 in a flat surface structure. The cover plate 580 may be made of a non-metallic substance so that the magnetic fields of the working coil 570 may pass through the cover plate 580. For example, the cover plate 580 may be made of a glass material having heat resistance against heat or the like (for example, ceramics glass). The cover plate 580 may dissipate heat of the shield filter 540.

In describing a process of assembling the second heat source module 500, while the base plate 510 is turned upside down, the mounting bracket 530 is coupled to the base plate 510. The mounting bracket 530 may be arranged around the base hole 512. The mounting bracket 530 is mounted to the base plate 510 and the mounting bracket 530 and the base plate 510 may be coupled to each other by, for example, welding (not limited thereto).

In this state, the shield filter 540 is coupled to the base plate 510 to block the base hole 512 of the base plate 510. The shield filter 540 may be disposed on the base plate 510, and a fastening process by a tool or a fastening tool is not performed.

Then, the coil assembly 550 and the supporter 520 may be laminated on the shield filter 540. The coil base 560 of the coil assembly 550 is larger than the shield filter 540, so that the shield filter 540 may be blocked.

In this state, the supporter 520 may be disposed on the coil assembly 550, and the supporter 520 and the coil base 560 may be coupled to each other by a fastening tool, such as a screw, etc. The supporter 520 and the mounting bracket 530 may also be coupled to each other by a fastener, such as a screw, etc. Herein, since the mounting bracket 530 has been coupled to the base plate 510 first, the supporter 520 and the coil assembly 550 may also be coupled to the base plate 510 by a medium of the mounting bracket 530.

In this process, the shield filter 540 may be pressed between the base plate 510 and the coil base 560. In other words, the shielding filter 540 may be compressed without a separate coupling means and securely fixed.

Next, the third heat source module 600 will be described with reference to FIGS. 7 to 11. The third heat source module 600 may be arranged at an upper portion of the casing 100, 200. The third heat source module 600 may generate radiant heat into the cavity S.

The third heat source module 600 may include a heating unit 610. The heating unit 610 may generate radiant heat in a downward direction, i.e., toward the cavity S, and may heat an upper portion of food. The heating unit 610 may be a graphite heater. The heating unit 610 may serve as a broil heater, and the heating unit may be used as usage of grill using direct fire heat or radiant heat.

The third heat source module 600 may be attached to the inner casing 100 or the outer casing 200. In the embodiment, the third heat source module 600 may be attached to the insulation upper plate 270. The third heat source module 600 may be disposed in the first electric chamber ES1. The outer upper plate 230 may be disposed above the third heat source module 600, so that the third heat source module 600 may be shielded. As shown in FIG. 1, the view shows the third heat source module 600 shielded by the outer upper plate 230.

The third heat source module 600 may move toward to the bottom of the cavity S, i.e., the second heat source module 500. The third heat source module 600 may include the moving assembly 630, so that the heating unit 610 may move. In the embodiment, since the heating unit 610 may move in upward and downward directions, the heating unit 610 may be represented as being raised and lowered.

The third heat source module 600 may include the moving assembly 630 including the heating unit 610 and protecting the heating unit 610, and the fixed assembly 640 provided at the insulation upper plate 270 to control upward and downward movements of the moving assembly 630. The third heat source module 600 may include a link assembly 650 provided at one portion of the moving assembly 630 to movably connect the moving assembly 630 to the fixed assembly 640. Hereinbelow, the above structure will be described.

The moving assembly 630 may be provided separately from the inner casing 100 and the outer casing 200 to be vertically movable inside the cavity S. Preferably, for example, the moving assembly 630 may be provided to surround a lateral portion of the heating unit 610, so that heat of the heating unit 610 is concentrated downward without being emitted sideways.

The moving assembly 630 may have multiple levels of height. For example, the moving assembly 630 may have a first level at the highest location, a second level located at the middle location, and a third level at the lowest location. When the moving assembly 630 is located at the third level, heat transferred to the heating unit 610 may be greatest. The processor 700 may adjust the height of the moving assembly 630 for each level.

The moving assembly 630 may include a heater housing 632 surrounding and protecting the heating unit 610, and an insulating member 635 provided at one end of the heater housing 632 and preventing heat or electromagnetic waves. As shown in the drawings, the heater housing 632 may have a square box shape (not limited thereto). A vertical through hole is provided in the bottom surface of the heater housing 632 so that heat of the heating unit 610 may pass through the hole.

The heater housing 632 may move vertically by passing through a gap between a fixed frame 641, which will be described in further detail below, and the protection cover 276. Therefore, the heater housing 632 may be shaped in a square box open upward, and have a predetermined thickness. The thicknesses of four side surfaces of the heater housing 632 may be less than a size of the gap between the fixed frame 641 and the protection cover 276.

Figure 8:
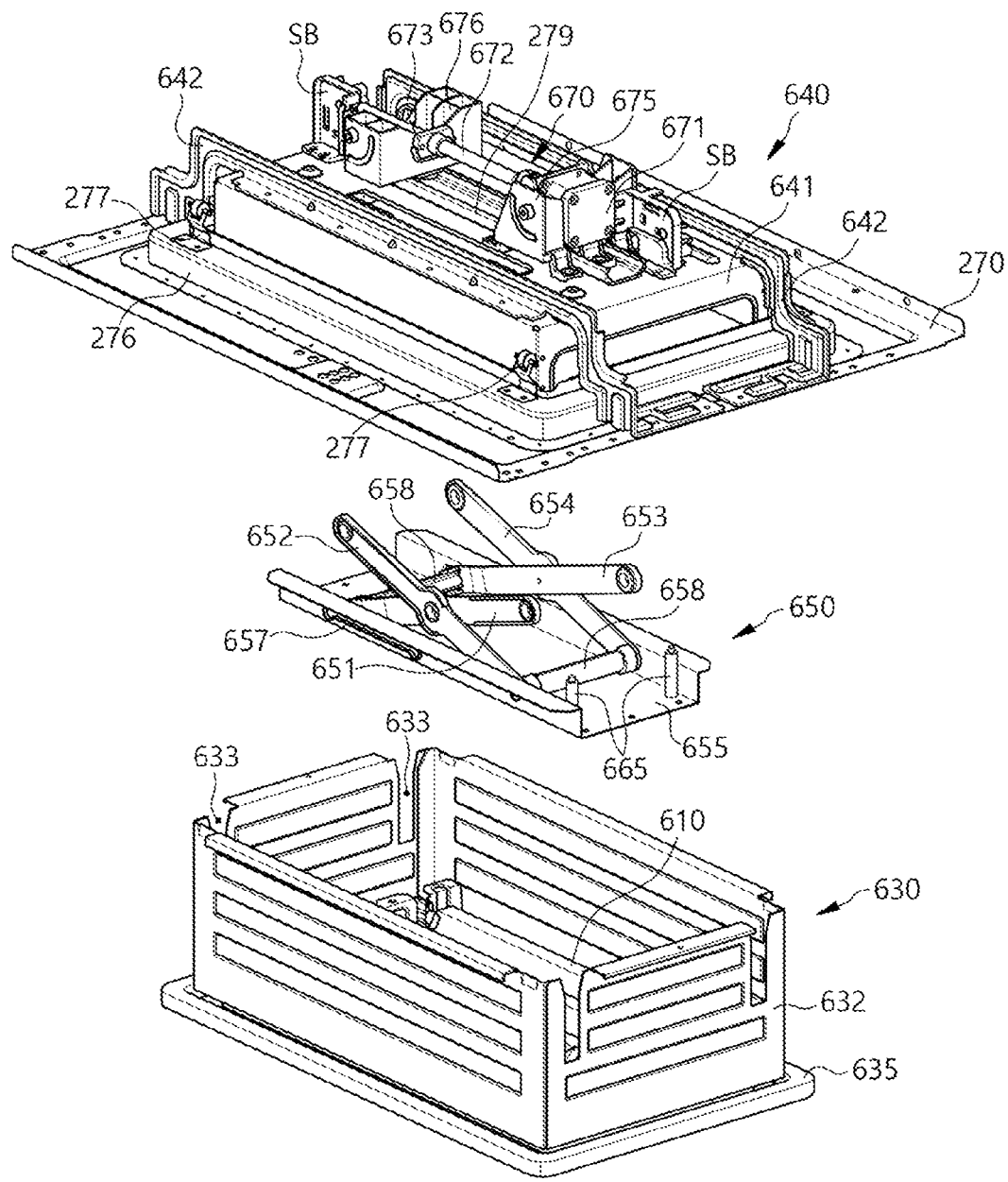
FIG. 8 is an exploded-perspective view showing components of the third heat source module shown in FIG. 7.

The heater housing 632 may have a guide groove 633 selectively storing a fixed guide 642, which will be described in further detail below. In other words, as shown in FIG. 8, the guide groove 633 may be formed in each of left and right surfaces of the heater housing 632 by penetrating the surface in a downward direction with a predetermined length. The guide groove 633 may store a frame coupling portion 643 of the fixed guide 642 when the moving assembly 630 is raised.

The insulating member 635 may have a rectangular frame shape as shown in the drawings (not limited thereto). Preferably, lateral ends of the insulating member 635 may be formed to protrude outward than the lateral ends of the heater housing 632. In other words, the exterior size of the insulating member 635 may be larger than the lateral size of the heater housing 632, so that electromagnetic waves may be prevented from leaking outward through the gap between the fixed frame 641 and the protection cover 276 when the moving assembly 630 is raised.

The heating unit 610 may be stored and fixed inside the heater housing 632. The heating unit 610 may have a transversally or longitudinally long shape, and preferably, for example, a plurality of heating units 610 may be provided and installed in an inner lower end of the heater housing 632. As shown in FIG. 5, for example, there are three heating units 610 arranged in the moving assembly 630.

The three heating units 610 may be operated independently. In other words, among the three heating units 610, any one or two heating units may be operated, or the three heating units 610 may be operated at the same time. The processor 700 may control the number of operated heating units among the three heating units 610, or control an operating time of the three heating units 610, or control the height of the moving assembly 630 and the height of the heating units 610.

Next, the fixed assembly 640 may be securely provided at an upper portion of the insulation upper plate 270. The fixed assembly 640 may support the moving assembly 630 so that the moving assembly 630 may move in the upward and downward directions while being supported by an upper surface of the insulation upper plate 270. The fixed assembly 640 may include a moving control means 670 to restrict the moving assembly 630 to move in the upward and downward directions by operation of the link assembly 650.

The link assembly 650 may be provided at an upper portion of the moving assembly 630. The link assembly 650 may include at least one link, and may guide the moving assembly 630 to move in the upward and downward directions while being connected to the fixed assembly 640. Herein, upper and lower ends of the link assembly 650 may be rotatably connected to the fixed assembly 640 and the moving assembly 630, respectively.

The insulation upper plate 270 may be a part of the fixed assembly 640. Then, the fixed assembly 640 may include the fixed frame 641 that is provided on the insulation upper plate 270 to support the moving control means 670.

Herein, the fixed frame 641 may be provided to be spaced apart of the protection cover 276 of the insulation upper plate 270. More specifically, the protection cover 276 may also have a rectangular shape like the insulation upper plate 270, and the protection cover 276 may have a vertical through hole at a center portion thereof like the insulation upper plate 270 to form a rectangular frame shape. Accordingly, the moving assembly 630 may move in the upward and downward directions through such the insulation upper plate 270 and the central hole of the protection cover 276.

The fixed frame 641 may have a rectangular shape smaller than the rectangular-shaped central hole of the protection cover 276. Therefore, a predetermined gap may be provided between the fixed frame 641 and the protection cover 276, and the heater housing 632 of the moving assembly 630, which will be described below, may move in the upward and downward directions through the gap.

The fixed frame 641 may be securely provided on the insulation upper plate 270. For this structure, the fixed guide 642 may be provided between the insulation upper plate 270 and the fixed frame 641. The fixed guide 642 may have an approximately '∩' shape (as viewed from the front) such as shown in the drawings. Therefore, an upper end of the fixed guide 642 may be attached to the fixed frame 641, and a lower end of the fixed guide 642 may be attached to the insulation upper plate 270 or the protection cover 276.

Figure 7:
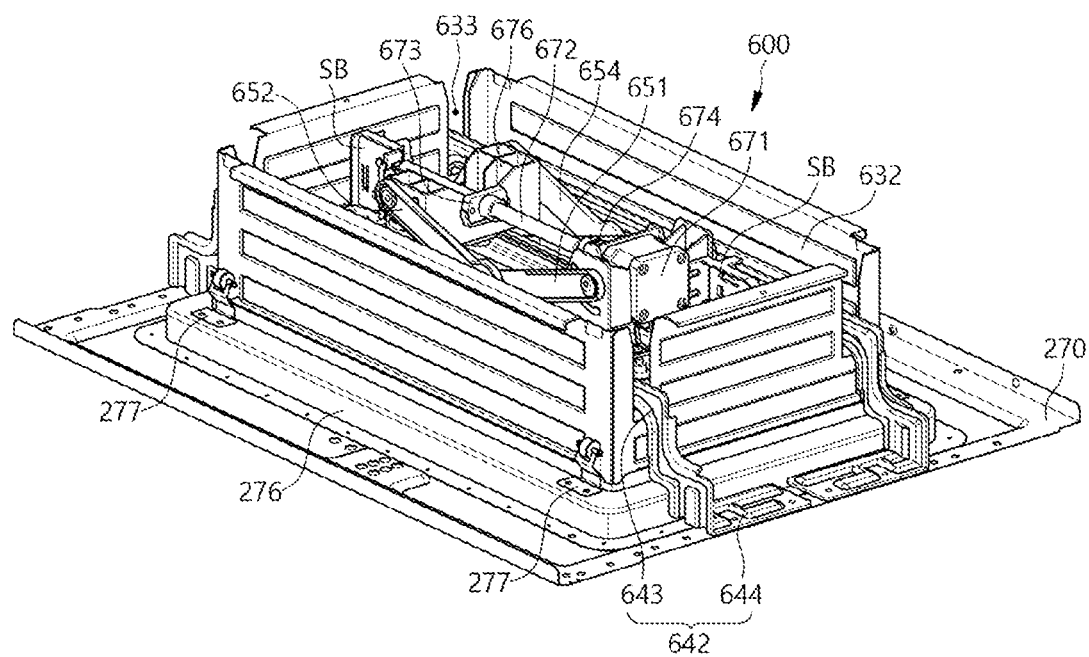
FIG. 7 is a perspective view showing the configuration of a third heat source module of the cooking appliance according to the embodiment of the present disclosure.

Specifically, as shown in FIG. 7, the fixed guide 642 may include the frame coupling portion 643 coupled to the fixed frame 641, and an upper coupling portion 644 fixed to the insulation upper plate 270 or the protection cover 276. In the present disclosure, it is embodied that the upper coupling portion 644, i.e., the lower end of the fixed guide 642, is attached to the upper surface of the insulation upper plate 270.

The fixed assembly 640 may include a sliding rail 279 supporting a moving bracket 676 or a lead nut 673, which will be described in further detail below, to be slidable. The sliding rail 279 may be provided with a transversally predetermined length on an upper surface of the fixed frame 641. The moving bracket 676 or the lead nut 673 may be transversally movably installed on the sliding rail 279.

The moving control means 670 may be provided on the fixed frame 641. The moving control means 670 may include a motor 671 generating rotation power, a lead screw 672 provided at one portion of the motor 671 and rotated in conjunction with the rotation power generated by the motor 671, and the lead nut 673 fastened to the lead screw 672.

The motor 671 may generate rotation power and a stepping motor may be used as the motor 671 so as to perform precise rotation control. The stepping motor may supply forward and reverse rotation movements in response to a rotation angle by purse control.

As shown in the drawings, the lead screw 672 may be a fine cylinder of a predetermined length, of which an outer surface is formed in a male screw. Herein, the male screw of the lead screw 672 is coupled to the lead nut 673 having a female screw corresponding to the male screw. Therefore, when the lead screw 672 is rotated by power of the motor 671, the lead nut 673 transversally moves along the lead screw 672. As described above, the lead screw 672 and the lead nut 673 may serve to change the forward and reverse rotation movements into a linear movement.

A connection coupling 674 may be provided between the motor 671 and the lead screw 672 to connect one end of the lead screw 672 to a motor shaft. In other words, as shown in FIG. 7, the connection coupling 674 may be provided between a right end of the lead screw 672 and the motor shaft protruding leftward from the motor 671.

The motor 671 may be provided to a fixed bracket 675 mounted to the fixed assembly 640, and the lead nut 673 may be mounted to the moving bracket 676 movably installed to the fixed assembly 640. The moving bracket 676 may be movably provided above the fixed frame 641 to move closer to or farther from the fixed bracket 675.

Specifically, for example, the fixed frame 641 may be provided above the insulation upper plate 270 to be spaced apart therefrom by the fixed guide 642, and a gap of predetermined size is formed between the fixed frame 641 and the protection cover 276, thereby forming a moving path of the heater housing 632, which will be described in further detail below.

When the lead screw 672 is rotated in response to rotation of the motor 671 mounted to the fixed bracket 675, the lead nut 673 moves transversally, whereby the moving bracket 676 moves transversally along the sliding rail 279.

Upper ends of a link of the link assembly 650 may be rotatably installed to the fixed bracket 675 and the moving bracket 676. In other words, when left and right upper ends of an "X"-shaped link provided in the link assembly 650 are respectively connected to the fixed bracket 675 and the moving bracket 676, the left and right upper ends of the "X"-shaped link may move closer to each other or farther from each other in response to leftward and rightward movements of the moving bracket 676, so that the moving assembly 630 fixed to the lower end of the link assembly 650 may move in upward and downward directions.

Meanwhile, the link assembly 650 may have a structure including at least one link, and the upper end of the link assembly 650 may be rotatably connected to the fixed assembly 640 and the lower end thereof may be rotatably connected to the moving assembly 630.

The link assembly 650 may include a pair of front links 651 and 652 and a pair of rear links 653 and 654 that are spaced apart from each other by a predetermined distance in a longitudinal direction. A link frame 655 coupled to the moving assembly 630 may be provided at lower ends of the front links 651 and 652 and the rear links 653 and 654.

Then, at least one of left and right lower ends of the front links 651 and 652 and at least one of left and right lower ends of the rear links 653 and 654 may be movably coupled to the link frame 655. Specifically, for example, the pair of front links 651 and 652 may be configured such that a front first link 651 and a front second link 652 formed in an "X"-shape may be coupled to each other to be rotatable on the center, in which the front first link 651 and the front second link 652 cross each other, as a rotation center. The pair of rear links 653 and 654 may be configured such that a rear first link 653 and a rear second link 654 formed in an "X"-shape may be coupled to each other to be rotatable on the center, in which the rear first link 653 and the rear second link 654 cross each other, as a rotation center.

The lower ends of the front first link 651 and the rear first link 653, which are installed to be spaced apart from each other in the longitudinal direction by a predetermined distance, may be connected to each other by a connection link 658. The lower ends of the front second link 652 and the rear second link 654 may be connected to each other by the connection link 658.

At least one of the left and right lower ends of the front links 651 and 652 and at least one of the left and right lower ends of the rear links 653 and 654 may be movably coupled to the link frame 655. In the embodiment, as shown in the drawing, the the lower ends of the front first link 651 and the rear first link 653 are installed to be movable in a transverse direction of the link frame 655.

Therefore, a first link protrusion hole 657 may be formed in a left half portion of the link frame 655, so that lower end shafts of the front first link 651 and the rear first link 653 are inserted into the first link protrusion hole 657 to be movable in the transverse direction.

Figure 9:
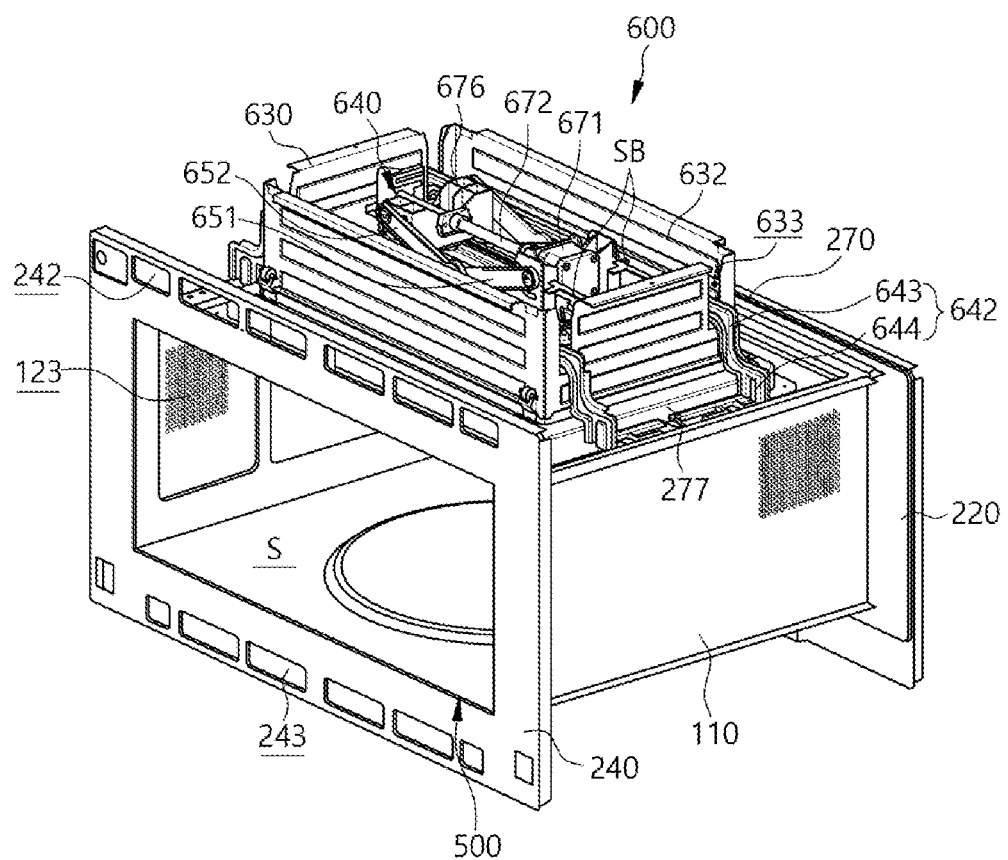
FIG. 9 is a perspective view showing the third heat source module shown in FIG. 7 arranged at a first location.
Figure 10:
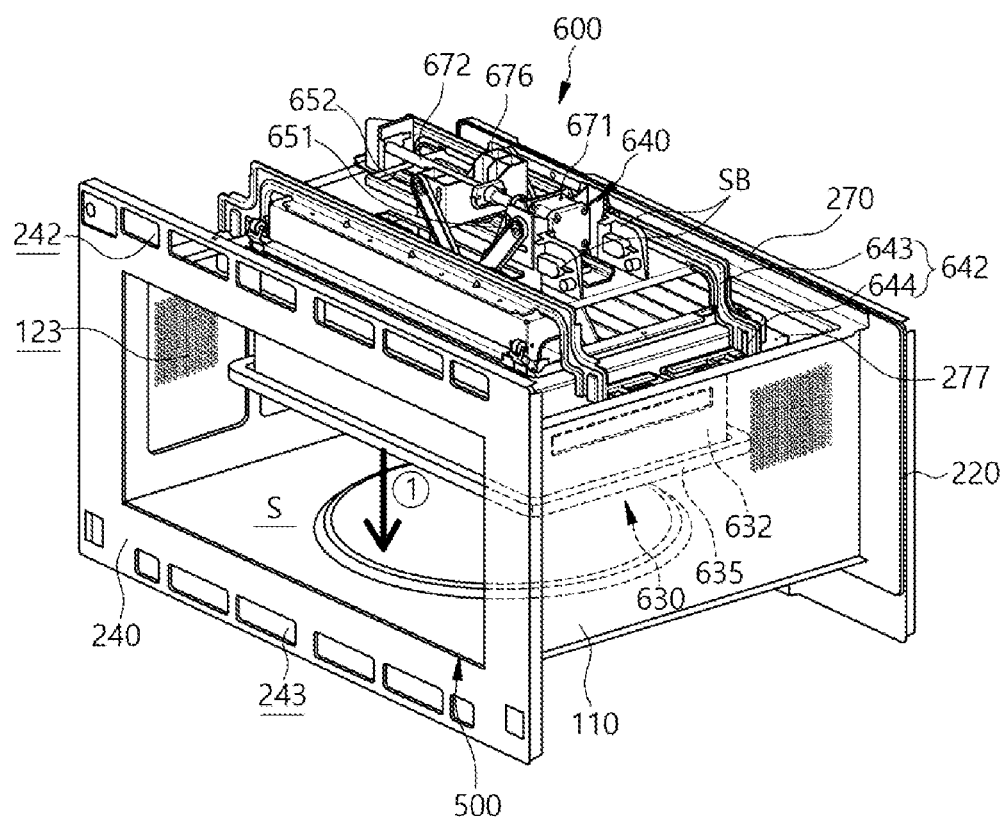
FIG. 10 is a perspective view showing the third heat source module shown in FIG. 7 arranged at a second location.

In FIG. 9, the moving assembly 630 is in the first location. In FIG. 10, the moving assembly 630 is in the second location. When the moving assembly 630 is in the second location, the heating units 610 are located closer to the food, so that the food may be heated up faster. As shown in FIG. 10, when the moving assembly 630 is in the second location, the fixed guide 642 and the motor 671 constituting the fixed assembly 640 may not be moved and fixed in their initial locations.

Figure 11:
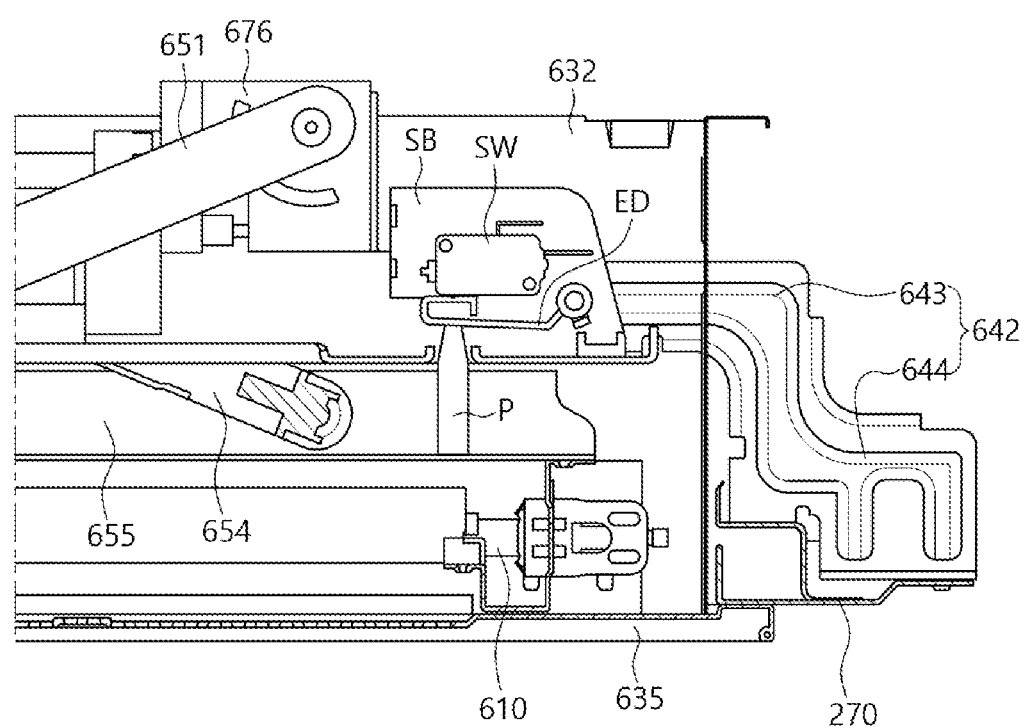
FIG. 11 is a sectional view showing a state where the third heat source module shown in FIG. 7 is arranged at the first location and a vertical movement detection switch is pushed by an operation pin.

FIG. 11 is a view showing the ON state of the pushed vertical movement detection switch SW arranged at the insulation upper plate 270. The vertical movement detection switch SW is provided to detect whether the moving assembly 630 is located in a first location of an initial location or in another location. Therefore, it is possible to detect whether the moving assembly 630 is raised or lowered. When the vertical movement detection switch SW is located in the first location, the vertical movement detection switch SW is pushed by the moving assembly 630 to be turned into the ON state, and in the ON state, the processor 700 may confirm that the moving assembly 630 is in the first location. When the moving assembly 630 moves downward from the first location (e.g., to a second location or a third location), the vertical movement detection switch SW is released from a pushed state and is turned into the OFF state. When the vertical movement detection switch SW is in the OFF state, the moving assembly 630 may move downward from the first location.

The processor 700 may confirm whether the vertical movement detection switch SW is in the ON state or the OFF state to determine whether the moving assembly 630 is in the first location or moves downward. When the vertical movement detection switch SW is in the ON state, the moving assembly 630 may be in the first location at the initial state and be recovered to the first location after moving downward.

As described above, for example, when the vertical movement detection switch SW is pushed and turned into the ON state, the processor 700 detects that the moving assembly 630 is in the first location and then may stop the motor 671. In other words, the processor 700 may stop the motor 671 to prevent the moving assembly 630 from being raised higher than the first location. In the embodiment, the vertical movement detection switch SW may limit a raised height of the moving assembly 630, and the number of rotation of the motor 671 may limit a lowered height of the moving assembly 630.

The vertical movement detection switch SW is arranged at the insulation upper plate 270 or the fixed guide 642 so as to remain fixed regardless of movement of the moving assembly 630. The moving assembly 630 may include an operation pin P pressing and operating the vertical movement detection switch SW. The operation pin P is arranged in the moving assembly 630, so that the operation pin P may be raised and lowered with the moving assembly 630.

Herein, the vertical movement detection switch SW may include an elastic drive part ED. The elastic drive part ED may be a part that is actually pressed by the operation pin P. When the operation pin P presses the elastic drive part ED, the elastic drive part ED may press the vertical movement detection switch SW. The operation pin P may have a pin shape of which an upper end is narrow, so that a contact portion of the vertical movement detection switch SW may be precisely pressed. In the embodiment, the operation pin P may press a wide surface of the elastic drive part ED and the elastic drive part ED may press the vertical movement detection switch SW, so that stable driving may be secured.

Both the vertical movement detection switch SW and the elastic drive part ED may be provided at a switch bracket SB. The switch bracket SB may be arranged at the fixed assembly 640. In the embodiment, the switch bracket SB may be arranged at the fixed guide 642 of the fixed assembly 640.

As shown in FIG. 10, in the embodiment, two vertical movement detection switches SW may be included in the third heat source module 600. The pair of vertical movement detection switches SW may be arranged adjacent to the pair of fixed guides 642, respectively. Thus, in the event any one of the pair of vertical movement detection switches SW is broken, but a remaining vertical movement detection switch SW is normally operated, recovering of the moving assembly 630 to the first location may be detected. It is understood that a single vertical movement detection switch SW may be provided.

As shown in FIG. 2, the cooking appliance may include a cooling fan module 810, 850. The cooling fan module 810, 850 may cool the cooking appliance, suction external air and supply the air into the cavity S. For example, the cooling fan module 810, 850 may suction air outside the cooking appliance and discharge air cooling the inside space of the cooking appliance to the outside space.

The cooling fan module 810, 850 may include a first cooling fan module 810 and a second cooling fan module 850. The first cooling fan module 810 and the second cooling fan module 850 may each be arranged at positions closer to an upper portion of the cavity S than a lower portion thereof.

The first cooling fan module 810 and the second cooling fan module 850 may each be arranged on the insulation upper plate 270. Herein, the first cooling fan module 810 and the second cooling fan module 850 may be arranged around the third heat source module 600 with the third heat source module 600 as the center.

The cooling fan modules 810 and 850 arranged as described above may cool the third heat source module 600 in various directions. The first cooling fan module 810 and the second cooling fan module 850 may be arranged in directions orthogonal to each other. The cooling fan modules 810 and 850 arranged as described above may form a continuous flow path through which air flows.

Furthermore, the first cooling fan module 810 and the second cooling fan module 850 may respectively discharge air toward different surfaces of the inner casing 100. The first cooling fan module 810 may discharge air toward a rear surface of the inner casing 100, more specifically, toward the third electric chamber ES3. The second cooling fan module 850 may discharge air toward a side surface of the inner casing 100, more specifically, toward the fifth electric chamber ES5. The air may meet the second electric chamber ES2 and then be discharged to the outside space through the air outlet part 243.

When the third heat source module 600 is in the first location (referring to FIG. 9), both the first cooling fan module 810 and the second cooling fan module 850 may cool the periphery of the heater housing 632. When the third heat source module 600 is in the second location (referring to FIG. 10), both the first cooling fan module 810 and the second cooling fan module 850 may cool the third heat source module 600 throughout while passing through an upper portion of the third heat source module 600.

Referring to FIG. 4, the supply duct 910 may be disposed in the inner casing 100. The supply duct 910 may be arranged to cover the inlet port 123 of the inner casing 100. The supply duct 910 may provide a path through which air of the electric chamber may be introduced into the cavity S. Air introduced into the cavity S through the supply duct 910 and the inlet port 123 may remove moisture in the cavity S. Herein, the air supplied through the inlet port 123 may be a part of air acting heat dissipation (cooling) while passing through the inside space of the casing 100, 200.

The supply duct 910 may extend in a shape of which a first end is bent, such as shown. This shape is for the supply duct 910 to avoid interference with the wave guide 420 of the first heat source module 400. In other words, the supply duct 910 may be arranged at one of the pair of inner side plates 110 of the inner casing 100 with the wave guide 420, and the supply duct 910 may be arranged at a different height from the wave guide 420.

The first end of the supply duct 910 may cover the inlet port 123, and a remaining portion of the supply duct 910 may provide a flow path in the cooking appliance while being in close contact with an outer surface of the inner side plate 110. The supply duct 910 may transfer air discharged from the first cooling fan module 810 to the inlet port 123, so that air supply into the cavity S may be efficiently performed.

The exhaust duct 940 may cover the outlet port 125 of the inner casing 100. The exhaust duct 940 may be arranged in the fifth electric chamber ES5, and may guide movement of air discharged from the outlet port 125. The exhaust duct 940 may be arranged on a surface of one of the inner side plates 110. Accordingly, air in the cavity S discharged to the outlet port 125 may move downward. The air moving downward may be guided to the second electric chamber ES2, and may be discharged to the air outlet part 243 of the outer front plate 240.

The exhaust duct 940 may be disposed on one of the inner side plate 110 of the inner casing 100 with the processor 700. In other words, the exhaust duct 940 may be disposed on the surface of the inner side plate 110 together with the processor 700. Herein, the exhaust duct 940 may be provided at a position farther from the door 300 than the processor 700. Therefore, air in the cavity S may be discharged from a rear portion of the casing 100, 200 farther from the door 300, and in a process in which air is discharged along the second electric chamber ES2, air may pass through a lower portion of the second heat source module 500, so that the second heat source module 500 may be cooled by the air. The exhaust duct 940 may have approximately a vertically long shape (not limited thereto).

For example, in the embodiment, since the magnetron 410 is also disposed at a portion protruding from the inner side plate 110 to be resultingly arranged in the third electric chamber ES3, a heating body may not be arranged in the fourth electric chamber ES4. Therefore, even when an air barrier 950 blocks the second electric chamber ES2 from the fourth electric chamber ES4, the heat sources may be efficiently cooled.

Figure 12:
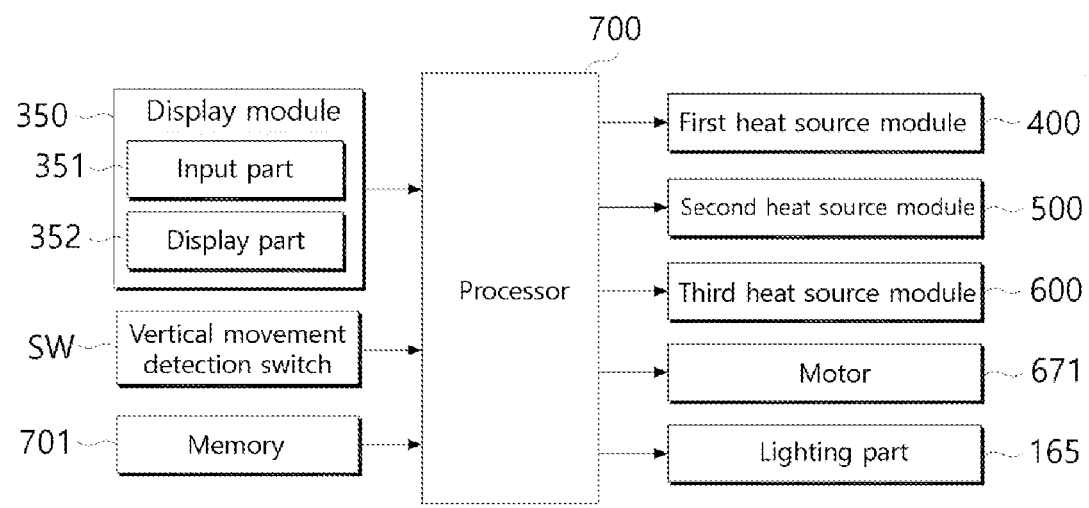
FIG. 12 is a block diagram showing connection between components and a processor constituting the cooking appliance according to the embodiment of the present disclosure.

FIG. 12 is a block diagram showing connection between components and a processor constituting the cooking appliance according to an embodiment of the present disclosure.

The processor 700 may be connected to the display module 350. The display module 350 may include the input part 351 and the display part 352. In the embodiment, the input part 351 and the display part 352 may be implemented as the display module 350 while being formed in an integrated module. The input part 351 may receive an operation mode and an operation order related to an operation of the cooking appliance from the user, and the display part 352 may display an operational state of the cooking appliance and a cooked state of food to the outside space.

When an operation mode and an operation order of the cooking appliance are input from the input part 351, the processor 700 may control an operation of the cooking appliance. The operation mode of the cooking appliance may be preset with preset cooking level and time. For example, the cooking level may be a power level of the first, second, third heat source module 400, 500, 600. The cooking time may be preset in response to the cooking level in advance, or may be preset or changed by the user.

Figure 13:
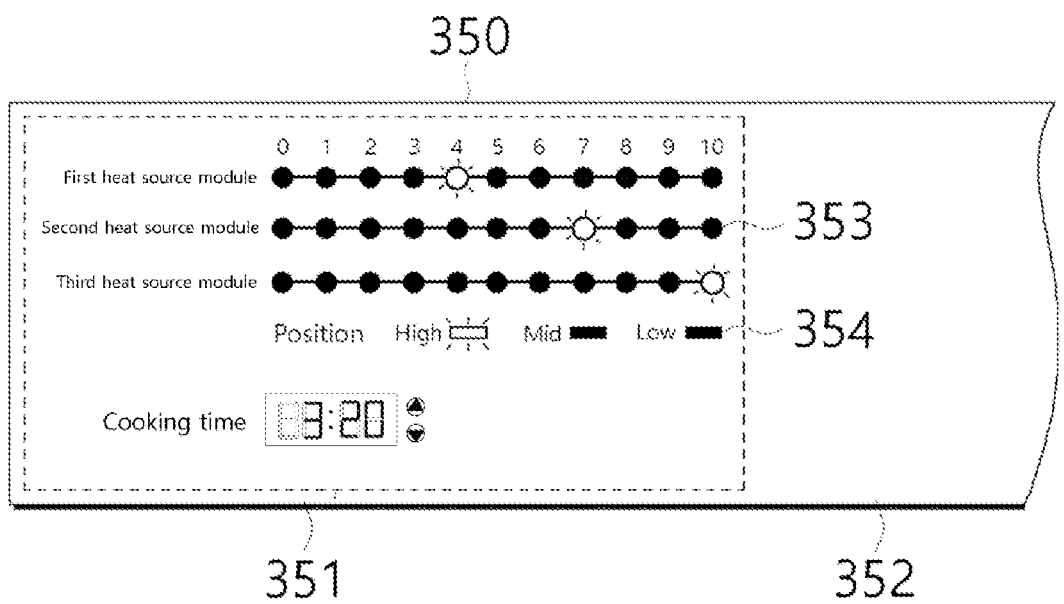
FIG. 13 is an example view showing an input part from which cooking levels of a plurality of heat sources are input in the cooking appliance according to the embodiment of the present disclosure.
Figure 15:
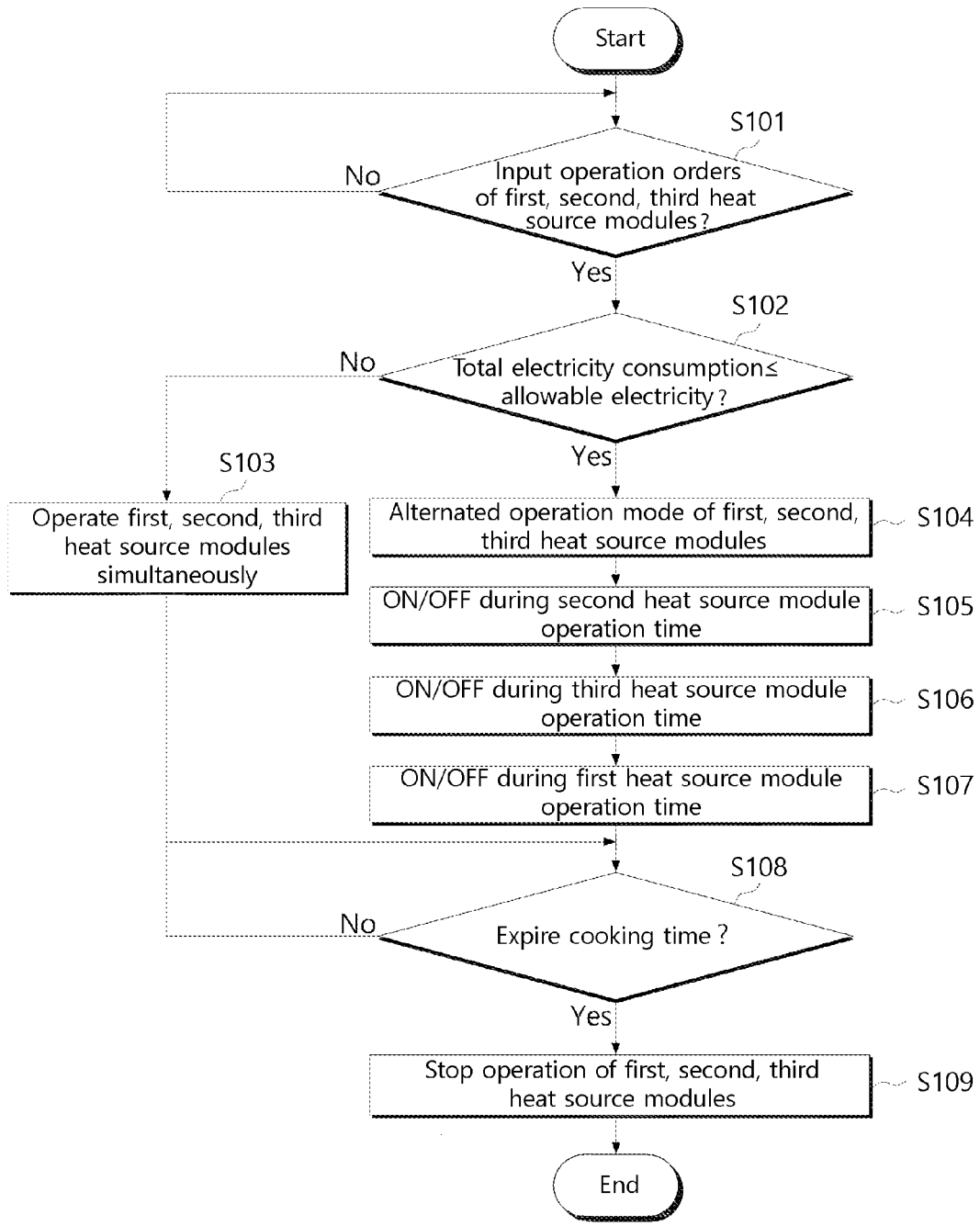
FIG. 15 is a flowchart showing a method for controlling the cooking appliance when all the plurality of heat sources according to the embodiment of the present disclosure are used.

FIG. 13 is a view an embodiment of the input part 351. Cooking level images 353 of the first, second, and third heat source modules 400, 500, and 600 are displayed on the input part 351, and when the user touches the cooking level images 353 to select cooking levels, the processor 700 may operate the first, second, and third heat source modules 400, 500, and 600 to the selected cooking levels. Each of the cooking levels may have a range, for example, from 0 to 10. Of course, these cooking levels may be adjusted.

For example, in an embodiment wherein the input part 351 is a touch-type input, when the user touches one of the cooking level images 353, the touched cooking level image 353 may emit light by an LED mounted therein. When a cooking level 0 is selected, the heat source module related to the selected cooking level is turned into the OFF state, and when the cooking level is increased, electricity consumption may be increased or operation time may become longer. In FIG. 13, as an example, a cooking level 4 is selected for the first heat source module 400, a cooking level 7 is selected for the second heat source module 500, and a cooking level 10 is selected for the third heat source module 600.

Furthermore, the input part 351 may display vertical location images 354 of the third heat source module 600. When the user touches the vertical location images 354 to select a vertical location of the third heat source module 600, the processor 700 may operate the link assembly 650 to allow the height of the moving assembly 630 to reach the selected vertical height. When the user touches each of the vertical location images 354, the touched display vertical location image 354 may emit light by an LED mounted therein.

FIG. 14 is a table showing an example of electricity consumption in response to the cooking levels of the second heat source module 500. The second heat source module may be, for example, an induction heater. The cooking level may be an operation mode of the second heat source module 500. When the cooking level is 0, the second heat source module 500 is turned OFF, and when the cooking level is 1, the second heat source module 500 is in the ON state for 6 seconds with electricity consumption (440W) corresponding to a cooling level 3 and then in the OFF state for next 6 seconds. When the cooking level is 2, the second heat source module 500 is in the ON state for 6 seconds with electricity consumption (640W) corresponding to a cooking level 4 and then in the OFF state for next 6 seconds. Electricity consumption is variably preset from the cooking level 4 to a cooking level 10. The cooking level is increased to 10, high electricity consumption may be used.

Herein, the second heat source module 500 may be operated for a preset operation time with electricity consumption (shown in FIG. 14) corresponding to a cooking level input from the input part 351. However, both the first and third heat source modules 400 and 600 may be operated for the preset operation time with electricity consumption corresponding to the cooking level 10. In other words, both the first and third heat source modules 400 and 600 are operated with electricity consumption at the highest cooking level (i.e., maximum electricity consumption of the cooking appliance). The electricity consumption and the operation time for each cooking level may be stored in a memory 701, which will be described in further detail below.

In FIG. 12, the processor 700 may control operations of the first, second, and third heat source modules 400, 500, and 600 and the motor 671 in response to the ON and OFF states detected by a vertical movement detection sensor SW. The motor 671 drives the link assembly 640 so that the moving assembly 630 may move upward and downward. Furthermore, when the operation order of the lighting part 165 is input, the processor 700 may turn ON or OFF of the lighting part 165.

The memory 701 may store electricity consumption and operation time of the first, second, and third heat source modules 400, 500, and 600. In the embodiment, the electricity consumption and the operation time of the first heat source module 400 are preset such that the first heat source module 400 is in the ON state for "electricity consumption corresponding to the cooking level 10" and is in the ON state for "a selected cooking level×3 seconds+2 seconds". The electricity consumption and the operation time of the second heat source module 500 are preset such that the second heat source module 500 is in the ON state for "12 seconds' with 'electricity consumption corresponding to a selected cooking levels". The electricity consumption and the operation time of the third heat source module 600 are preset such that the third heat source module 600 is in the ON state for "a selected cooking level×10 seconds" with "electricity consumption corresponding to the cooking level 10". Of course, the electricity consumption and the operation time may be variable.

Herein, the operation time of the first, second, third heat source module may include an operation time cycle including a time for the first, second, third heat source module 400, 500, 600 to be turned into the ON/OFF state. In the embodiment, the operation time cycle of the first heat source module 400 is total 32 seconds, and in the 32 seconds, the time of ON is "the selected cooking level×3 seconds+2 seconds", and the time of OFF is a time obtained by subtracting the ON time from the 32 seconds. The operation time cycle of the second heat source module 500 is total 12 seconds, and all time is the ON time. The operation time cycle of the third heat source module 600 is "a selected cooking level×10 seconds", and all time is the ON time.

Meanwhile, the cooking appliance of the embodiment may be configured to operate all the first, second, and third heat source modules 400, 500, and 600, or to operate some of the heat source modules. Alternatively, according to another embodiment, the cooking appliance may be configured to operate all the first, second, and third heat source modules 400, 500, and 600, or to operate one or selected two of the heat source modules at the same time. Herein, the operating all heat source modules at the same time or the operating of one or two of the heat source modules at the same time may be determined in response to environment where the cooking appliance is used. In other words, the operating method may be determined in response to allowable electricity of a location where the cooking appliance is used. Specifically, when total electricity consumption used when the first, second, and third heat source modules 400, 500, and 600 are operated at the same time is larger than the allowable electricity of the location where the cooking appliance is used, the first, second, and third heat source modules 400, 500, and 600 may not be operated at the same time. Because, when all the first, second, and third heat source modules 400, 500, and 600 are used at the same time, a circuit breaker trips and cuts off power due to overvoltage or overcurrent.

Therefore, when an operation order to operate all the first, second, and third heat source modules 400, 500, and 600 is input, the processor 700 compares the total electricity consumption when all the first, second, and third heat source modules 400, 500, and 600 are used at the same time to the allowable electricity, and when the total electricity consumption is less than or equal to the allowable electricity, the processor 700 operates all the first, second, and third heat source modules 400, 500, and 600 at the same time, and on the contrary, when the total electricity consumption is greater than the allowable electricity, the processor 700 does not operate the first, second, and third heat source modules 400, 500, and 600 at the same time, thus separately operating the heat source modules.

However, in a case where all the first, second, and third heat source modules 400, 500, and 600 are operated to cook even with the total electricity consumption is greater than the allowable electricity, the processor 700 may operate the first, second, and third heat source modules 400, 500, and 600 alternately one by one, not operate all the first, second, and third heat source modules 400, 500, and 600 at the same time.

In the embodiment, when the first, second, and third heat source modules 400, 500, and 600 are alternately operated, the processor 700 may alternately operate the first, second, and third heat source modules 400, 500, and 600 according to a preset operation order. The alternated operation order may be preset as an order of "the second heat source module 500→the third heat source module 600→the first heat source module 400". Herein, in the alternated operation, electricity consumption and operation time of the first, second, and third heat source modules 400, 500, and 600 are based on the electricity consumption and the operation time stored in the memory 701.

As an example, in a case where the first, second, and third heat source modules 400, 500, and 600 are alternately used, electricity consumption and operation time when cooking levels of the first, second, and third heat source modules 400, 500, and 600 are selected as 7 will be described. First, the alternated order is preset as an order of the second heat source module→the third heat source module→the first heat source module as described above. Based on the alternated order, the second heat source module 500 is in the ON state for 12 seconds with electricity of 1120 W corresponding to the cooking level 10, then the third heat source module 600 is in the ON state for 70 seconds (=cooking level 7×10 seconds) with electricity of 1600 W corresponding to the cooking level 10, and then, the first heat source module 400 is in the ON state for 23 seconds (=cooking level 7×3 seconds+2 seconds) with electricity of 1600 W corresponding to the cooking level 10, and in the OFF state for 9 seconds obtained by subtracting 32 seconds of the ON time from the total 32 seconds.

As another embodiment, when the first, second, and third heat source modules 400, 500, and 600 are alternately operated, in a case where a cooking level 4 is selected for the first heat source module 400, a cooking level 5 is selected for the second heat source module 500, and a cooking level 0 is selected for the third heat source module 600, an alternated order is an order of "the second heat source module 500→the third heat source module 600→the first heat source module 400" as described above. Accordingly, the second heat source module 500 is in the ON state first for 12 seconds with electricity of 640 W corresponding to the cooking level 4, and then the third heat source module 600 is in the ON state for 50 seconds with electricity of 1600 W corresponding to the cooking level 10. Then, the first heat source module 400 should be operated, but the cooking level 0 is selected for the first heat source module 400, the first heat source module 400 is in the OFF state.

Meanwhile, the cooking appliance of the embodiment may be configured to input the cooking time by using the input part 351. When the input cooking time is larger than the operation time cycle of the first, second, and third heat source modules 400, 500, and 600, the first, second, and third heat source modules 400, 500, and 600 may be repeatedly operated in the alternated order within the cooking time. In other words, until the input cooking time ends, alternated operation of the first, second, and third heat source modules 400, 500, and 600 is repeated.

In another embodiment of the present disclosure, the alternated order may be changed. However, in the exemplary embodiment of the present disclosure, the alternated order is preset as the order of "the second heat source module 500→the third heat source module 600→the first heat source module 400". A reason for operating the second heat source module 500 first, for example, is to determine whether the container B exists inside the cavity S first. The priority operation of the second heat source module 500, for example, is to operate the cooking appliance only when the container exists on the second heat source module 500 after existence of the container B on the upper surface of the second heat source module 500 is detected when the second heat source module 500 is operated. However, when the container B does not exist on the upper surface of the second heat source module 500, the cooking appliance is not operated.

The container B may be detected by the camera module 730. Alternatively, among a flow of magnetic fields generated from the second heat source module 500, magnetic fields changed by the container B are used to detect the container B.

FIGS. 16 to 21 are views showing a cooking appliance according to another embodiment of the present disclosure. In FIGS. 16 to 21, in addition to the first heat source module 400 to the third heat source module 600 described above, a fourth heat source module 1100 may be included in the cooking appliance.

The fourth heat source module 1100 may be arranged at a rear surface of the casing 100, 200. A power supply unit 1770 may be arranged on an upper surface of the casing 100, 200. Hereinbelow, the same reference numerals are given to the same structures as in the previous embodiment, detailed descriptions are omitted, and a structure different from the previous embodiment will be described.

Figure 16:
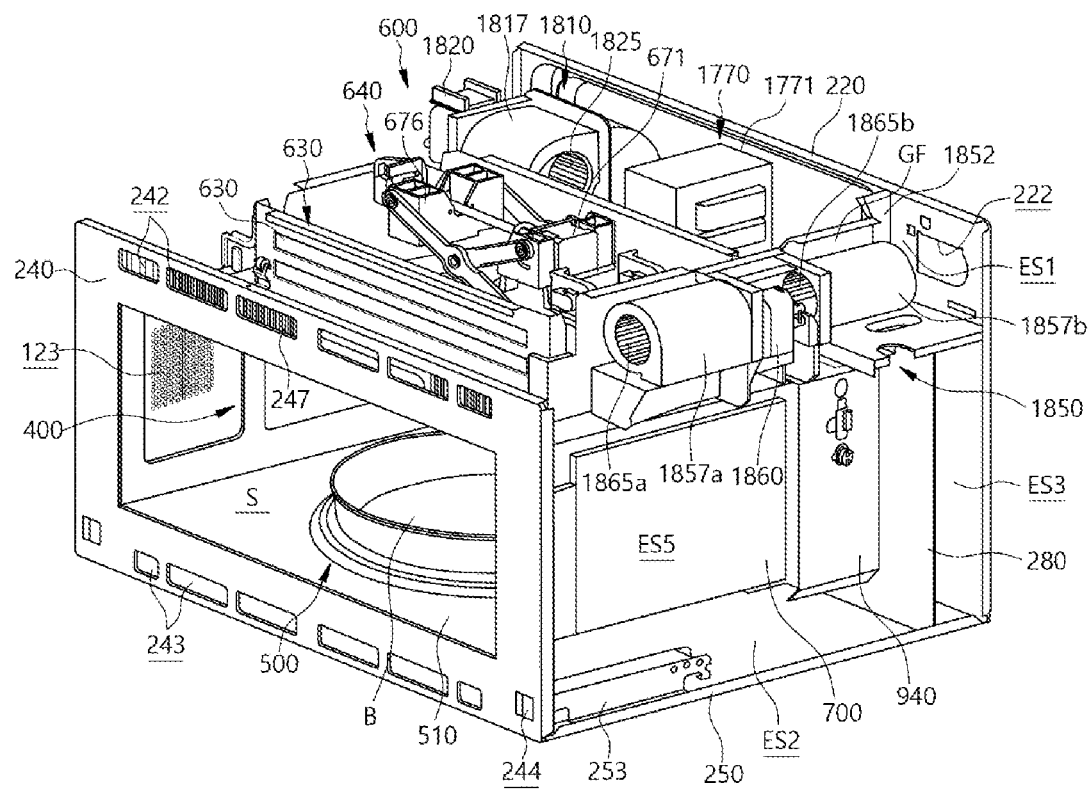
FIG. 16 is a perspective view showing a cooking appliance according to a second embodiment of the present disclosure.
Figure 17:
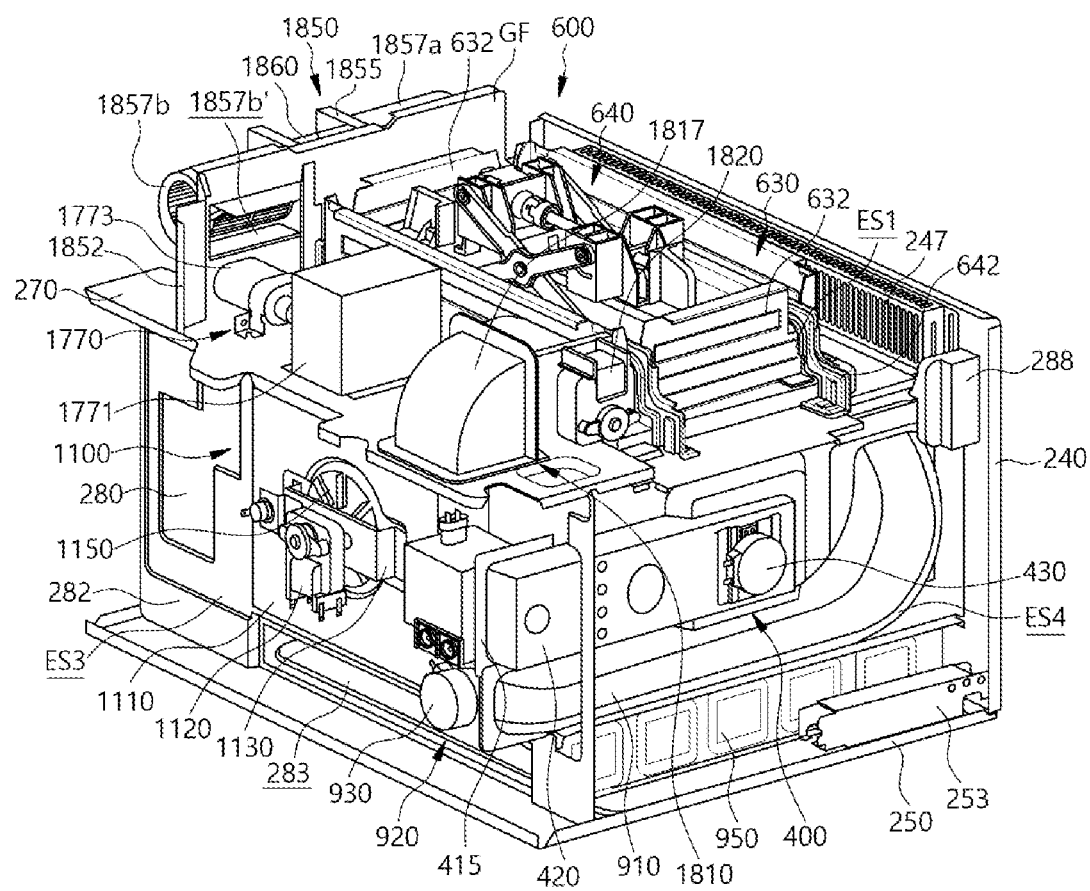
FIG. 17 is a perspective view showing the second embodiment shown in FIG. 16, the view being taken at a different angle from FIG. 16.

As shown in FIGS. 16 and 17, the power supply unit 1770 may be arranged on the insulation upper plate 270. The power supply unit 1770 may include a high voltage transformer 1771, and the high voltage transformer 1771 may have relatively large volume and generate high temperature heat. Accordingly, it is important to efficiently cool the high voltage transformer 1771.

For reference, in FIG. 16, the outer rear plate 220 is shown, but in FIG. 17, the outer rear plate 220 is omitted. In FIG. 16, the fourth heat source module 1100 may be arranged in the third electric chamber ES3 provided between the outer rear plate 220 and the insulation rear plate 280. As shown in FIG. 17, the fourth heat source module 1100 may be provided at the insulation rear plate 280 arranged in front of the outer rear plate 220. The fourth heat source module 1100 may be a convection heater. In other words, the fourth heat source module 1100 may provide heat for convection-heating of food in the cavity S.

As described above, in the embodiment, the first heat source module 400, the second heat source module 500, the third heat source module 600, and the fourth heat source module 1100 may be arranged in the electric chambers differently from each other in the casing 100, 200. In other words, the first heat source module 400, the second heat source module 500, the third heat source module 600, and the fourth heat source module 1100 may be arranged at different surfaces of the casing 100, 200 from each other. The plurality of heat sources may be composed of different types of heat sources. Accordingly, the plurality of heat sources may provide different types of heating means to the food in different directions.

The fourth heat source module 1100 may be a convection heater. The fourth heat source module 1100 may generate convection heat inside the cavity S together with a convection fan, thereby improving the uniformity of the cooking. Alternatively, the convection fan may be omitted in the fourth heat source module 1100, and like the third heat source module 600, the fourth heat source module 1100 may provide the radiant heat to food by using a heating wire.

As shown in FIG. 17, the fourth heat source module 1100 includes the convection housing 1110. The convection housing 1110 may be arranged at the insulation rear plate 280, a convection chamber may be disposed inside the convection housing 1110, and a convection heater (not shown) may be disposed in the convection chamber. The convection heater may be formed in a bar type having a predetermined length and a predetermined diameter. For example, the convection heater may be a sheath heater with a metal protection tube of the heating wire. Alternatively, the convection heater may be a carbon heater, a ceramic heater, and a halogen heater in which a filament is sealed inside a tube made of a transparent or translucent material.

A motor bracket 1130 may be arranged in the convection housing 1110, and a convection motor 1120 may be mounted to the motor bracket 1130. The convection motor 1120 may rotate the convection fan (not shown) in the convection housing 1110. When the convection fan is rotated by the convection motor 1120, heat of the convection heater may heat food inside the cavity S. The reference numeral 1150 represents an outlet through which heat in the convection chamber is discharged to the outside space.

When operation of the fourth heat source module 1100 is input, power may be applied to the convection motor 1120 to rotate the convection fan, and power is applied to the convection heater to heat the convection heater. Therefore, the convection fan may generate forced convection between the cavity S and the convection chamber in the convection housing 1110, and the forced convection generated by the convection fan becomes hot air by receiving heat from the convection heater, so that the temperature in the cavity S may be increased and food may be heated.

FIG. 16 is a view showing the first cooling fan module 1810. The first cooling fan module 1810 may be arranged on the insulation upper plate 270. The first cooling fan module 1810 may include a first fan housing 1817. A first fan motor 1820 may be provided at one portion of the first fan housing 1817. The first fan motor 1820 may be connected to a shaft (not shown), and the shaft may be coupled to a first fan blade 1825.

Figure 19:
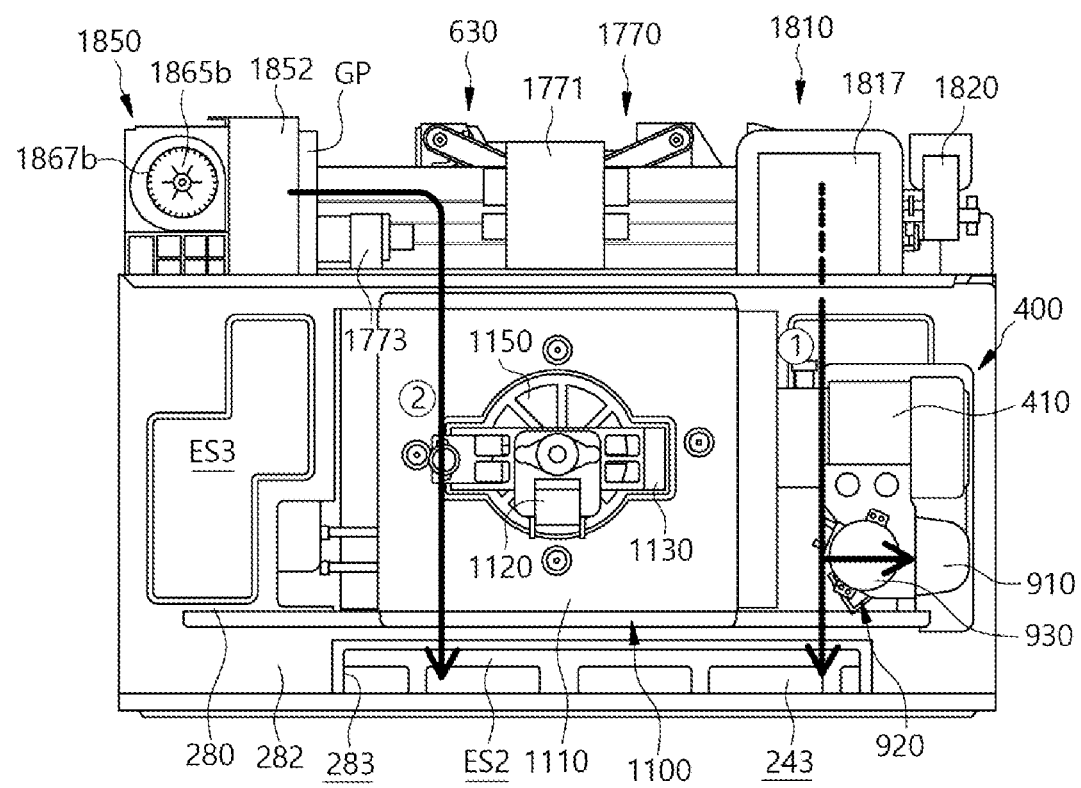
FIG. 19 is a rear view showing the structure of the second embodiment shown in FIG. 16.

The first fan blade 1825 may discharge air downward, i.e., a direction of gravity. As shown in FIG. 19, air is discharged downward from the first cooling fan module 1810. The discharged air may be discharged into the third electric chamber ES3. The fourth heat source module 1100 and the magnetron 410 of the first heat source module 400 may be arranged in the third electric chamber ES3, so that the fourth heat source module 1100 and the magnetron 410 may be cooled by the first cooling fan module 1810.

Figure 20:
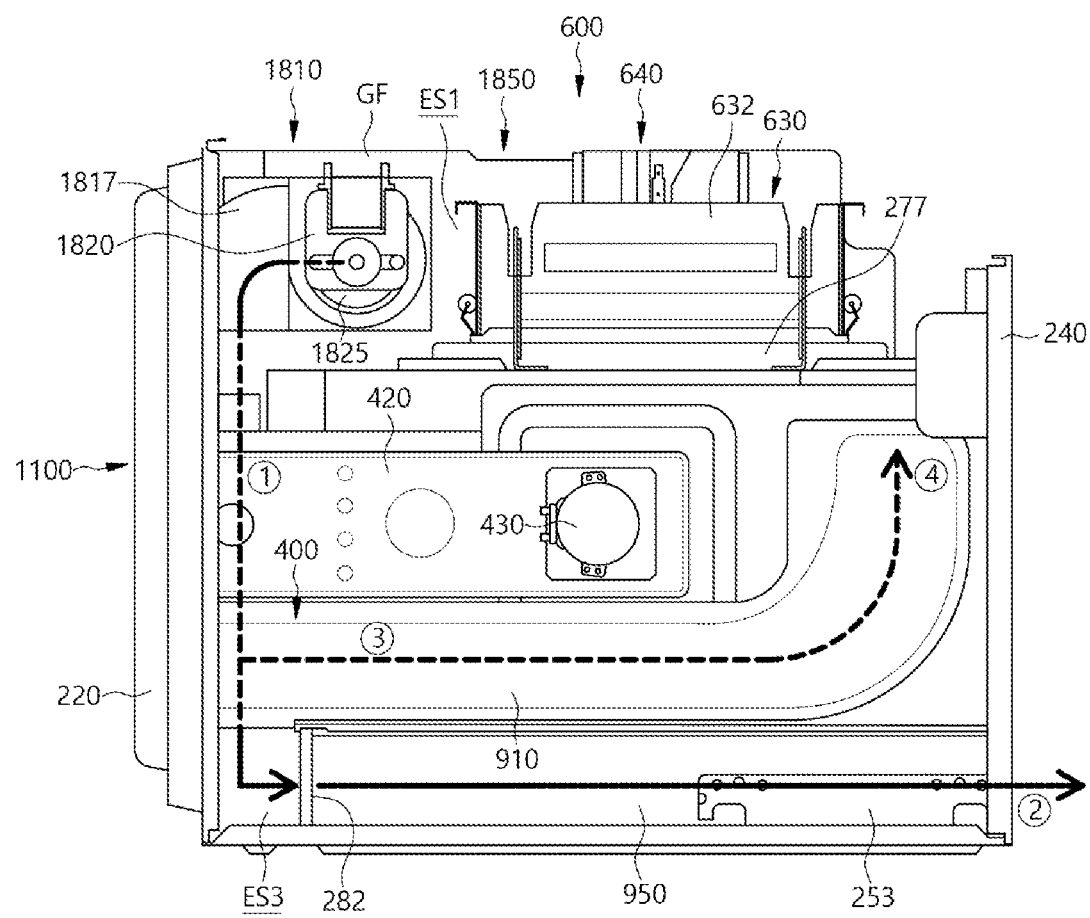
FIG. 20 is a left side view showing the structure of the second embodiment shown in FIG. 16.

Furthermore, air discharged from the first cooling fan module 1810 may pass through the third electric chamber ES3, and may flow downward to be introduced into the second electric chamber ES2. As shown in FIGS. 19 and 20, some of the air discharged from the first cooling fan module 1810 may move forward to the door 300 (direction of arrow ③ in FIG. 18) along the supply duct 910, and may be guided toward the inside space of the cavity S (arrow ④).

The second cooling fan module 1850, as shown in FIG. 16, may cool the cooking appliance like the first cooling fan module 1810, and may allow external air to be efficiently supplied into the cavity S. The second cooling fan module 1850 may include a second fan housing 1857a, 1857b forming the frame and a second fan motor 1860 arranged at one portion of the second fan housing 1857a, 1857b.

The second fan housing 1857a, 1857b may include a first drive housing 1857a and a second drive housing 1857b respectively arranged at opposite sides. The second fan motor 1860 may be disposed between the first drive housing 1857a and the second drive housing 1857b. The second fan motor 1860 may be connected to a shaft (not shown), and the shaft may be coupled to a pair of second fan blades 1865a and 1865b. The shaft may extend in opposite directions from the second fan motor 1860, and the pair of second fan blades 1865a and 1865b may be respectively coupled to opposite portions of the shaft.

Herein, the pair of second fan blades 1865a and 1865b may be respectively arranged in the first drive housing 1857a and the second drive housing 1857b. One of the pair of second fan blades 1865a may discharge air in the direction of gravity, and the rest 1865b may discharge air in a direction perpendicular to the direction of gravity, i.e., a direction of the first electric chamber ES1.

Figure 21:
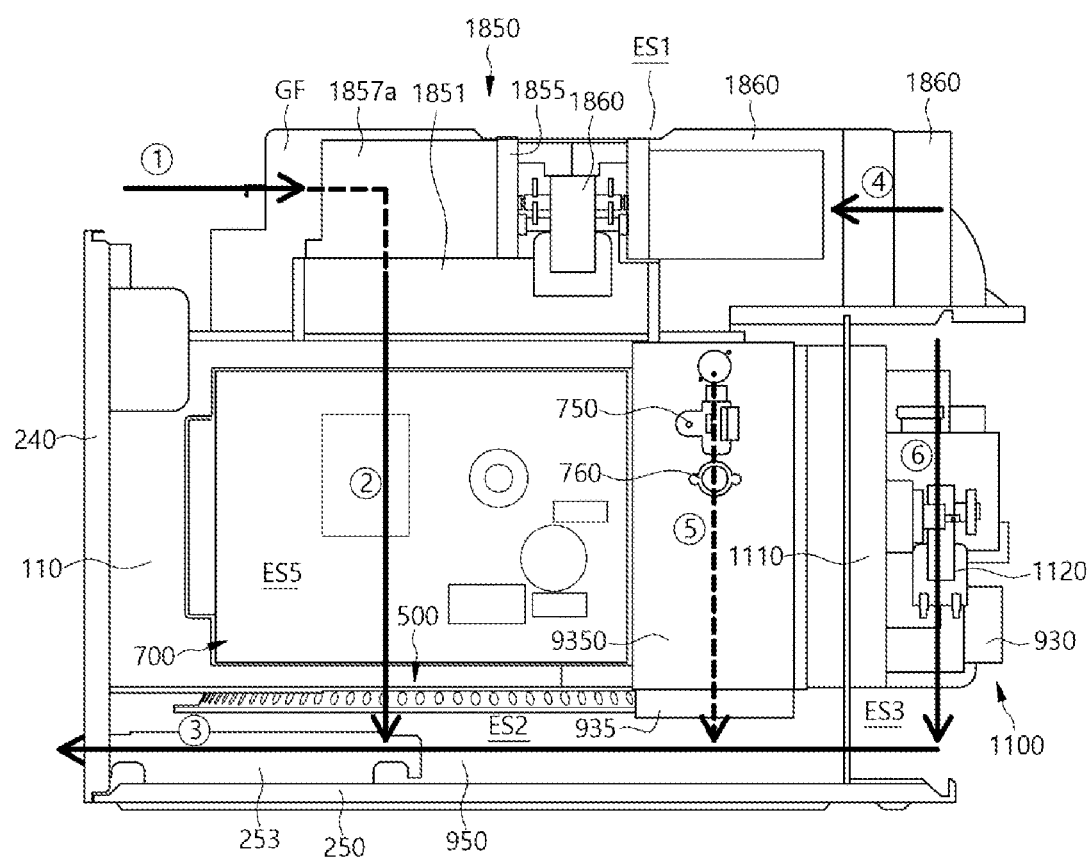
FIG. 21 is a right side view showing the structure of the second embodiment shown in FIG. 16.

As shown in FIG. 21, the first drive housing 1857a may be open downward, so that the second fan blade 1865a provided in the first drive housing 1857a may discharge air downward (direction of arrow ②). Accordingly, the processor 700 arranged in the fifth electric chamber ES5 may be cooled.

Meanwhile, referring to FIG. 17, an outlet 1857*b*' of the second drive housing 1857*b* may be open toward the first electric chamber ES1. Accordingly, the second fan blade 1865*b* disposed in the second drive housing 1857*b* may discharge air toward the first electric chamber ES1, more specifically, toward the power supply unit 1770 through the outlet 1857*b*' of the second drive housing 1857*b*. Accordingly, the second cooling fan module 1850 may cool the power supply unit 1770.

The air cooling the power supply unit 1770 may flow downward. As shown in FIG. 21, air is introduced into an inward direction (arrow ④) of the second drive housing 1857*b*, and then may flow toward the third electric chamber ES3 (arrow ⑥) by passing through the power supply unit 1770. In this process, the fourth heat source module 1100 may be cooled.

FIGS. 18 to 21 are views showing an air circulation structure in the cooking appliance according to the embodiment. Since the cooking appliance of the embodiment may include the first heat source module 400, the second heat source module 500, the third heat source module 600, and the fourth heat source module 1100, heat generated from the heat sources needs to be cooled. Hereinbelow, a cooling structure of the heat sources and other parts will be described.

For example, (i) in the first electric chamber ES1, cooling of the lighting fixture 790, the distance sensor 710, the third heat source module 600, the third temperature sensor (not shown), and/or the power supply unit 1770 may be required, (ii) in the second electric chamber ES2, cooling of the second heat source module 500 may be required, (iii) in the third electric chamber ES3, cooling of the fourth heat source module 1100 and/or the camera module 730 may be required, (iv) in the fifth electric chamber ES5, cooling of the processor 700, the humidity sensing module 750, the second temperature sensor 760, and/or the temperature block switch (not shown) may be required.

Then, in order to perform the cooling of the parts, the embodiment may include the first cooling fan module 1810 and the second cooling fan module 1850 described above. The first cooling fan module 1810 may cool the second electric chamber ES2 and the third electric chamber ES3, and the second cooling fan module 1850 may cool the first electric chamber ES1, the second electric chamber ES2, and the fifth electric chamber ES5. It is understood that the first cooling fan module 1810 may be arranged at the upper portion of the casing 100, 200, thereby cooling a part of the first electric chamber ES1. Furthermore, the first cooling fan module 1810 may discharge air toward the duct assembly 920 arranged in the third electric chamber ES3, so that the first cooling fan module 1810 may serve to supply the air into the cavity S.

Specifically, as shown in FIG. 16, in the embodiment, both the air inlet part 242 through which external air is suctioned and the air outlet part 243 through which air is discharged may be disposed at a front surface of the cooking appliance. The external air may be introduced into an upper portion of the front surface of the cooking appliance and circulate in the cooking appliance and then be discharged through a lower portion of the front surface of the cooking appliance. Therefore, in the embodiment, even when the cooking appliance is installed in a built-in manner, efficient air circulation may be performed.

Furthermore, as shown in FIGS. 16 and 17, in the embodiment, the plurality of electric chambers may be provided outside the inner casing 100, and air may efficiently cool the parts while flowing through the electric chambers. Herein, the air barrier 950 may prevent air introduced into the second electric chamber ES2 from moving upward through the fourth electric chamber ES4, and therefore, the air may cool the second heat source module 500 of the second electric chamber ES2 and then move forward to flow through the air outlet part 243.

Then, in the embodiment, the insulation upper plate 270 and the insulation rear plate 280 may be arranged outside the inner casing 100 and may prevent heat in the cavity S from being directly transferred to the parts. The insulation upper plate 270 and the insulation rear plate 280 may perform the cooling performance of the cooking appliance together with the first cooling fan module 1810 and the second cooling fan module 1850.

As shown in FIG. 16, the first cooling fan module 1810 may be disposed at the insulation upper plate 270, more specifically, at a position closer to the third electric chamber ES3 and the fourth electric chamber ES4 (left side in FIG. 16) based on the center of the insulation upper plate 270. Then, the second cooling fan module 1850 may also be arranged at the insulation upper plate 270, more specifically, at a position closer to the fifth electric chamber ES5 based on the center of the insulation upper plate 270.

Figure 18:
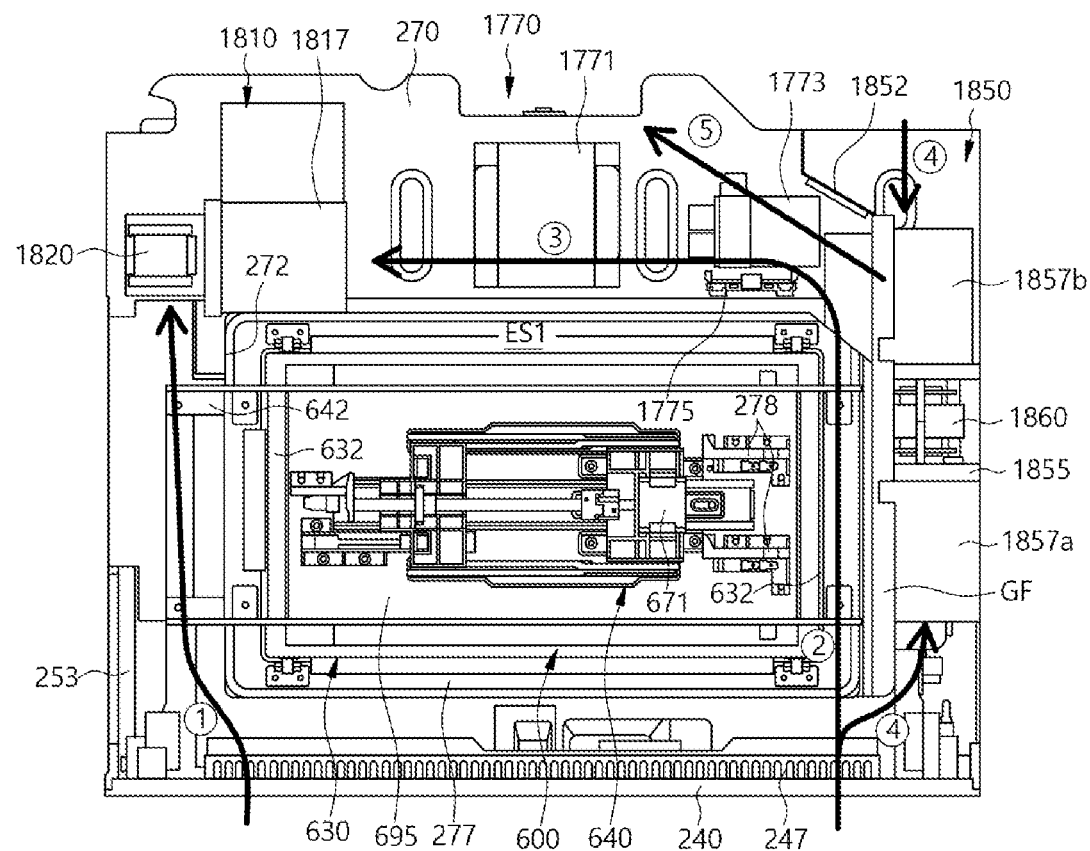
FIG. 18 is a plan view showing the structure of the second embodiment shown in FIG. 16.

FIG. 18 illustrates exemplary flows of air suctioned by the first cooling fan module 1810 and the second cooling fan module 1850. Air suctioned through the outer front plate 240 may be introduced into the first cooling fan module 1810. Herein, the air may be introduced toward the first cooling fan module 1810 in two streams. Herein, air introduced along the left side (direction of arrow ①) of the cooking appliance by the first cooling fan module 1810 may flow along a gap between the heater housing 632 of the third heat source module 600 and the outer upper plate 230 (which is omitted in FIG. 16) arranged at a left edge of the casing 100, 200. Then, air introduced along the right side (direction of arrow ②) of the cooking appliance by the first cooling fan module 1810 may flow along a gap between the heater housing 632 of the third heat source module 600 and a guide fence GF.

As described above, in the process in which air is suctioned into the first cooling fan module 1810, the distance sensor 710, the lighting fixture 790, and the third heat source module 600 may be cooled. Furthermore, the power supply unit 1770 arranged on the flow path of air may be cooled. Arrow ③ represents a direction in which air suctioned into the first cooling fan module 1810 passes through the power supply unit 1770. Therefore, the power supply unit 1770 may be cooled by the first cooling fan module 1810.

At the same time, the second cooling fan module 1850 may also suction external air through the outer front plate 240. Air introduced toward the second cooling fan module 1850 (direction of arrow ④) may cool the first electric chamber ES1 while flowing toward the second cooling fan module 1850. Herein, two streams of air may be suctioned toward the first drive housing 1857*a* and the second drive housing 1857*b* included in the second cooling fan module 1850. Air suctioned toward the first drive housing 1857*a* may be introduced through the air inlet part 242 of the outer front plate 240, and may cool a front portion of the first electric chamber ES1 closer to the door 300.

Then, the air suctioned by the first cooling fan module 1810 and the second cooling fan module 1850 may flow to the lower portion of the cooking appliance. Referring to FIG. 19, the air suctioned by the first cooling fan module 1810 may be discharged downward, i.e., toward the third electric chamber ES3 (direction of arrow ①). In this process, the magnetron 410 of the first heat source module 400 may be cooled. The magnetron 410 constituting the first heat source module 400 is disposed at a lower portion of the first cooling fan module 1810, so that air discharged downward (direction of arrow ①) from the first cooling fan module 1810 may cool the magnetron 410 while flowing. Then, air passing through the third electric chamber ES3 may be introduced into the second electric chamber ES2 through the ventilation part 283 provided at the lower portion of the insulation rear plate 280.

Meanwhile, as shown in FIG. 21, air suctioned into the first drive housing 1857a of the second cooling fan module 1850 may be discharged downward, i.e., toward the fifth electric chamber ES5 (direction of arrow ④). In this process, the processor 700 and the humidity sensing module 750 are arranged at the exhaust duct 940, and the second temperature sensor 760 may be cooled. Specifically, the processor 700 generating high temperature heat may be disposed below the first drive housing 1857a, so that the processor 700 may be efficiently cooled.

Next, air passing through the fifth electric chamber ES5 may be introduced into the second electric chamber ES2, air cooling the second heat source module 500 in the second electric chamber ES2 may be discharged to the outside space (direction of arrow ③) through the air outlet part 243.

Meanwhile, air suctioned into the second drive housing 1857b of the second cooling fan module 1850 may be discharged in a horizontal direction. Specifically, as shown in FIG. 19, air suctioned into the second drive housing 1857b may be discharged toward the first electric chamber ES1, i.e., the power supply unit 1770 through an outlet 1857b' of the second drive housing 1857b (referring to FIG. 17). Accordingly, the second cooling fan module 1850 may cool the power supply unit 1770.

The air cooling the power supply unit 1770 may flow downward. As shown in FIG. 19, air discharged from the second drive housing 1857b may be discharged toward the power supply unit 1770 and then flow downward to the third electric chamber ES3 (arrow ②). In this process, the fourth heat source module 1100 may be cooled. Air passing through the fourth heat source module 1100 may be introduced into the second electric chamber ES2 and then flow forward to be discharged through the air outlet part 243.

As shown in FIG. 21, air may also be transferred toward the second electric chamber ES2 through the exhaust duct 940. The exhaust duct 940 may guide air, which is discharged from the cavity S, downward (direction of arrow ⑤) to transfer the air to the second electric chamber ES2. The air discharged from the cavity S may also be discharged to the outside space (direction of arrow ③) through the air outlet part 243.

Herein, the air introduced into the second electric chamber ES2 by the first cooling fan module 1810 and the second cooling fan module 1850 may flow only forward, and may not be re-introduced into the fourth electric chamber ES4. This is because the air barrier 950 may be disposed below the fourth electric chamber ES4. As shown in FIG. 21, the air barrier 950 may guide air forward.

FIG. 20 is a view showing the fourth electric chamber ES4. As shown in FIG. 20, the wave guide 420 constituting the first heat source module 400 and the supply duct 910 may be disposed in the fourth electric chamber ES4. Air discharged to the lower side of the first cooling fan module 1810 (arrow ①) may be introduced into the supply duct 910. Herein, although not shown in FIG. 20, when the duct assembly 920 provided in the supply duct 910 is opened, the air discharged from the first cooling fan module 1810 may be introduced into the supply duct 910 through the duct assembly 920. The air flowing forward (direction of arrow ③) along the supply duct 910 may be introduced into the cavity S through the inlet port. Arrow ④ represents a moving direction of air introduced into the cavity S. In FIG. 20, arrow ② represents a direction in which air discharged from the first cooling fan module 1810 and introduced into the second electric chamber ES2 flows along the opposite portion of the air barrier 950.

Through the flow of air as described above, the first heat source module 400 to the fourth heat source module 1100, the power supply unit 1770, the magnetron 410, the processor 700, etc. may be cooled. Furthermore, the flow paths of the embodiment may prevent air from flowing backward, and may guide air in a constant direction to perform efficient cooling. Specifically, in the embodiment, even when a separate tubular structure is not provided, a flow of air may be generated by using a gap between the parts.

Embodiments of the present disclosure are described with reference to the accompanying drawings. The disclosure may, however, be embodied in many different manners and should not be construed as limited to the embodiments set forth herein. It is understood that a person having ordinary skill in the art to which the present disclosure art would implement this disclosure in other specific manners without changing the technical idea or necessary features of the present disclosure. For this reason, the disclosed embodiments are intended to be illustrative in all aspects, and not restrictive.

What is claimed is:

1. A cooking appliance comprising:
    a casing having a cavity;
    a door provided to open and close the cavity;
    a plurality of heat source modules disposed in the casing; and
    a processor to control operations of the plurality of heat source modules,
    wherein when the plurality of heat source modules are alternately operated, a heat source module of the plurality of heat source modules is located at a bottom surface of the cooking appliance is operated first,
    wherein the plurality of heat source modules are operated in response to a comparison result between a total electricity consumption used when all the plurality of heat source modules are simultaneously operated and a preset amount of allowable electricity.

2. The cooking appliance of claim 1, wherein when the total electricity consumption is greater than the preset amount of allowable electricity, the plurality of heat source modules are alternately operated such that the plurality of heat source modules are not operating at the same time.

3. The cooking appliance of claim 1, wherein when an operation order to operate all the heat source modules is input, and when the total electricity consumption is less than or equal to the preset amount of allowable electricity, all of the heat source modules are operated at the same time.

4. The cooking appliance of claim 1, wherein the plurality of heat source modules comprise:
    a first heat source module disposed at a side surface of the casing;
    a second heat source module disposed at a bottom surface of the casing; and
    a third heat source module disposed at an upper portion of the casing.

5. The cooking appliance of claim 4, wherein when the first, second, and third heat source modules are alternately operated, the second heat source module is operated first.

6. The cooking appliance of claim 4, wherein the second heat source module is operated when a container is detected at an upper surface of the second heat source module.

7. The cooking appliance of claim 4, wherein when the processor alternately operates the first, second, and third heat source modules, the processor alternately operates the first, second, and third heat source modules in order of the second heat source module, then the third heat source module, and then the first heat source module.

8. The cooking appliance of claim 7, further comprising: an input part by which cooking levels of the first, second, and third heat source modules are configured to receive an input from a user, wherein the processor is configured to determine an electricity consumption and an operation time of the first, second, and third heat source modules, respectively, in response to the input cooking level of the first, second, and third heat source modules, respectively, and the processor is configured to alternately operate the first, second, and third heat source modules in response to the electricity consumption and operation time of the first, second, and third heat source modules, respectively.

9. The cooking appliance of claim 8, wherein the processor is configured to operate the second heat source module for a first preset time with a first electricity consumption corresponding to an input cooking level of the second heat source module, and to operate the third heat source module for a time of an input cooking level of the third heat source module x a second preset time with a second electricity consumption corresponding to a maximum cooking level of the second heat source module, and to operate the first heat source module for a time of an input cooking level of the first heat source module x a third preset time with the second electricity consumption and to stop operation of the first heat source module for a fourth preset time.

10. The cooking appliance of claim 7, further comprising:
an input part configured to receive a cooking time input from a user,
wherein when the processor alternately operates the first, second, and third heat source modules, the processor repeats the alternate operation of the first, second, and third heat source modules until the input cooking time ends.

11. The cooking appliance of claim 4, wherein the first heat source module is configured to emit microwaves toward the cavity, and the second heat source module is configured to emit magnetic fields toward the cavity, and the third heat source module is configured to emit radiant heat toward the cavity.

12. A method for controlling a cooking appliance comprising a first heat source module, a second heat source module, and a third heat source module respectively located at a side surface, a bottom surface, and an upper portion of a casing having a cavity formed therein, the method comprising:

inputting, via an input part, an operation command for each of the first, second, and third heat source modules;

comparing, via a processor, total electricity consumption when the first, second, and third heat source modules are simultaneously operating to a preset amount of allowable electricity; and operating, via the processor, the first, second, and third heat source modules in response to a comparison result of the total electricity consumption and the preset amount of allowable electricity.

13. The method of claim 12, wherein when an operation order to operate all the heat source modules is input, and when it is determined that the total electricity consumption is less or equal to the preset amount of allowable electricity, the first, second, and third heat source modules are operated at the same time.

14. The method of claim 12, wherein when it is determined that the total electricity consumption is greater than the preset amount of allowable electricity, the first, second, and third heat source modules are alternately operated.

15. The method of claim 14, wherein when the first, second, and third heat source modules are alternately operated, the second heat source module located at the bottom surface of the casing is operated first.

16. The method of claim 15, wherein when the first, second, and third heat source modules are alternately operated, the first, second, and third heat source modules are operated in order of the second heat source module, then third heat source module, and then first heat source module.

* * * * *